United States Patent
Liu et al.

(10) Patent No.: US 10,904,908 B2
(45) Date of Patent: Jan. 26, 2021

(54) GRANTLESS UPLINK TRANSMISSION FOR EMTC-U

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 15/926,032

(22) Filed: Mar. 20, 2018

(65) Prior Publication Data
US 2018/0352563 A1 Dec. 6, 2018

Related U.S. Application Data

(60) Provisional application No. 62/513,895, filed on Jun. 1, 2017.

(51) Int. Cl.
  *H04W 72/12* (2009.01)
  *H04L 1/18* (2006.01)
  *H04L 5/00* (2006.01)
  *H04L 27/00* (2006.01)
  (Continued)

(52) U.S. Cl.
  CPC ....... *H04W 72/1268* (2013.01); *H04L 1/1812* (2013.01); *H04L 1/1864* (2013.01); *H04L 1/1887* (2013.01); *H04L 1/1896* (2013.01); *H04L 5/0044* (2013.01); *H04L 5/0048* (2013.01); *H04L 5/0053* (2013.01); *H04L 27/0006* (2013.01); *H04W 72/0446* (2013.01);
  (Continued)

(58) Field of Classification Search
  None
  See application file for complete search history.

(56) References Cited

U.S. PATENT DOCUMENTS

2017/0245294 A1* 8/2017 Worrall ................ H04W 72/10
2017/0288817 A1* 10/2017 Cao ....................... H04L 1/1812
2018/0139773 A1* 5/2018 Ma ..................... H04W 72/0453
(Continued)

FOREIGN PATENT DOCUMENTS

WO  WO-2016167828 A1 * 10/2016 ........ H04W 72/1268

OTHER PUBLICATIONS

International Search Report and Written Opinion—PCT/US2018/032719—ISA/EPO—dated Oct. 11, 2018.
(Continued)

*Primary Examiner* — Anh Ngoc M Nguyen
(74) *Attorney, Agent, or Firm* — Holland & Hart LLP

(57) ABSTRACT

Methods, systems, and devices for wireless communication are described. A base station may transmit downlink control information to a user equipment (UE). The downlink control information may identify a grantless uplink group associated with one or more grantless uplink subframes for the UE. The UE may transmit uplink control information for the one or more grantless uplink subframes associated with the indicated uplink group of the UE. The UE may then transmit grantless uplink data during at least one of the one or more grantless uplink subframes based at least in part on the grantless uplink group associated for the UE and the uplink control information.

30 Claims, 18 Drawing Sheets

(51) Int. Cl.
*H04W 76/27* (2018.01)
*H04W 72/04* (2009.01)

(52) U.S. Cl.
CPC ...... *H04W 72/121* (2013.01); *H04W 72/1284* (2013.01); *H04W 76/27* (2018.02)

(56) References Cited

U.S. PATENT DOCUMENTS

2018/0359762 A1* 12/2018 Xiong .................. H04B 7/2656
2019/0053265 A1* 2/2019 Kim .................. H04W 72/0446
2019/0110310 A1* 4/2019 Obregon ........... H04W 72/1284
2019/0124680 A1* 4/2019 Li ..................... H04W 72/0446
2019/0159139 A1* 5/2019 Yamada ............. H04W 52/346

OTHER PUBLICATIONS

Partial International Search Report—PCT/US2018/032719—ISA/EPO—dated Aug. 13, 2018.

* cited by examiner

GRANTLESS UPLINK TRANSMISSION FOR EMTC-U

CROSS REFERENCES

The present Application for patent claims priority to U.S. Provisional Patent Application No. 62/513,895 by LIU, et al., entitled "GRANTLESS UPLINK TRANSMISSION FOR EMTC-U," filed Jun. 1, 2017, assigned to the assignee hereof.

BACKGROUND

The following relates generally to wireless communication, and more specifically to grantless uplink transmissions for machine type communications (MTC) in a shared radio frequency spectrum band, such as an enhanced MTC (eMTC) system operating in an unlicensed radio frequency spectrum band (eMTC-U).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In a wireless communications system, narrowband interference may impact communications in a subsection of the available bandwidth. In order to decrease the effects of such narrowband interference, the wireless communications system may use a frequency hopping technique. Frequency hopping may involve switching a carrier among many frequency channels in the available bandwidth, such that only some of the communications may be effected by the narrowband interference.

SUMMARY

The described techniques relate to improved methods, systems, devices, or apparatuses that support grantless uplink transmission for machine type communications (MTC) in a shared radio frequency spectrum band, such as an enhanced MTC (eMTC) system operating in an unlicensed radio frequency spectrum band (eMTC-U).

A method of wireless communication is described. The method may include receiving, at a user equipment (UE), a radio resource control (RRC) message comprising an indication of a uplink group of the UE, the uplink group associated with one or more uplink subframes, transmitting, by the UE, uplink control information for the one or more uplink subframes associated with the indicated uplink group of the UE, and transmitting unscheduled uplink data during at least one of the one or more uplink subframes based at least in part on the uplink group of the UE and the uplink control information.

An apparatus for wireless communication is described. The apparatus may include means for receiving, at a user equipment (UE), a radio resource control (RRC) message comprising an indication of a uplink group of the UE, the uplink group associated with one or more uplink subframes, means for transmitting, by the UE, uplink control information for the one or more uplink subframes associated with the indicated uplink group of the UE, and means for transmitting unscheduled uplink data during at least one of the one or more uplink subframes based at least in part on the uplink group of the UE and the uplink control information.

Another apparatus for wireless communication is described. The apparatus may include a processor, memory in electronic communication with the processor, and instructions stored in the memory. The instructions may be operable to cause the processor to receive, at a user equipment (UE), a radio resource control (RRC) message comprising an indication of a uplink group of the UE, the uplink group associated with one or more uplink subframes, transmit, by the UE, uplink control information for the one or more uplink subframes associated with the indicated uplink group of the UE, and transmit unscheduled uplink data during at least one of the one or more uplink subframes based at least in part on the uplink group of the UE and the uplink control information.

A non-transitory computer readable medium for wireless communication is described. The non-transitory computer-readable medium may include instructions operable to cause a processor to receive, at a user equipment (UE), a radio resource control (RRC) message comprising an indication of a uplink group of the UE, the uplink group associated with one or more uplink subframes, transmit, by the UE, uplink control information for the one or more uplink subframes associated with the indicated uplink group of the UE, and transmit unscheduled uplink data during at least one of the one or more uplink subframes based at least in part on the uplink group of the UE and the uplink control information.

Some examples of the method, apparatus, and non-transitory computer-readable medium described above may further include processes, features, means, or instructions for determining, based at least in part on the RRC message, a set of uplink resources for the uplink control information for the one or more uplink subframes.

Some examples of the method, apparatus, and non-transitory computer-readable medium described above may further include processes, features, means, or instructions for determining a frequency subband of a system bandwidth based at least in part on the uplink group of the UE. In some examples of the method, apparatus, and non-transitory computer-readable medium described above, the unscheduled uplink data may be transmitted using the frequency subband of the system bandwidth during the at least one of the one or more uplink subframes.

Some examples of the method, apparatus, and non-transitory computer-readable medium described above may further include processes, features, means, or instructions for determining, based at least in part on the RRC message, a resource block allocation to the UE for the unscheduled uplink data. In some examples of the method, apparatus, and non-transitory computer-readable medium described above, the resource block allocation to the UE may be a subset of a total set of resource blocks associated with the frequency subband, and the unscheduled uplink data may be transmitted using the resource block allocation during the at least one of the one or more uplink subframes.

Some examples of the method, apparatus, and non-transitory computer-readable medium described above may further include processes, features, means, or instructions for receiving downlink control information from a base station.

Some examples of the method, apparatus, and non-transitory computer-readable medium described above may further include processes, features, means, or instructions for determining, based at least in part on the downlink control information, a frame structure and an uplink subframe type for the unscheduled uplink data. Some examples of the method, apparatus, and non-transitory computer-readable medium described above may further include processes, features, means, or instructions for transmitting the unscheduled uplink data during the at least one of the one or more uplink subframes may be further based at least in part on the determined frame structure and the uplink subframe type.

Some examples of the method, apparatus, and non-transitory computer-readable medium described above may further include processes, features, means, or instructions for determining, based at least in part on the downlink control information, that an unscheduled uplink data transmission may be permissible during a current frame. Some examples of the method, apparatus, and non-transitory computer-readable medium described above may further include processes, features, means, or instructions for transmitting the unscheduled uplink data during the at least one of the one or more uplink subframes may be further based on the determination that the unscheduled uplink data transmission may be permissible during the current frame.

Some examples of the method, apparatus, and non-transitory computer-readable medium described above may further include processes, features, means, or instructions for transmitting uplink capability information of the UE to a base station.

In some examples of the method, apparatus, and non-transitory computer-readable medium described above, the indication of the uplink group of the UE comprises an explicit identification of the uplink group of the UE.

In some examples of the method, apparatus, and non-transitory computer-readable medium described above, the uplink group of the UE may be identified based at least in part on a number of uplink subframes and a number of repetitions for the unscheduled uplink data.

Some examples of the method, apparatus, and non-transitory computer-readable medium described above may further include processes, features, means, or instructions for providing a measurement report to a base station. In some examples of the method, apparatus, and non-transitory computer-readable medium described above, the UE may be associated with the uplink group based at least in part on the measurement report.

In some examples of the method, apparatus, and non-transitory computer-readable medium described above, the uplink control information comprises one or more of: a new data indicator, a redundancy version, a hybrid automatic repeat request (HARQ) identifier, a UE identifier, a number of repetitions for uplink control information, and a number of repetitions for the unscheduled uplink data.

Some examples of the method, apparatus, and non-transitory computer-readable medium described above may further include processes, features, means, or instructions for determining the number of repetitions based at least in part on a signal strength measurement or signaling from a base station.

In some examples of the method, apparatus, and non-transitory computer-readable medium described above, the uplink control information comprises an indication of resource blocks associated with the unscheduled uplink data.

In some examples of the method, apparatus, and non-transitory computer-readable medium described above, the resource blocks associated with the unscheduled uplink data comprise a subset of a total number of resource blocks allocated to the UE for the unscheduled uplink data in the RRC message.

A method of wireless communication is described. The method may include transmitting to a user equipment (UE), by a base station, a radio resource control (RRC) message comprising an indication of a uplink group of the UE, the uplink group associated with one or more uplink subframes, receiving, from the UE, uplink control information for the one or more uplink subframes associated with the indicated uplink group of the UE, and receiving unscheduled uplink data during at least one of the one or more of the uplink subframes based at least in part on the uplink group of the UE is assigned and the uplink control information.

An apparatus for wireless communication is described. The apparatus may include means for transmitting to a user equipment (UE), by a base station, a radio resource control (RRC) message comprising an indication of a uplink group of the UE, the uplink group associated with one or more uplink subframes, means for receiving, from the UE, uplink control information for the one or more uplink subframes associated with the indicated uplink group of the UE, and means for receiving unscheduled uplink data during at least one of the one or more of the uplink subframes based at least in part on the uplink group of the UE is assigned and the uplink control information.

Another apparatus for wireless communication is described. The apparatus may include a processor, memory in electronic communication with the processor, and instructions stored in the memory. The instructions may be operable to cause the processor to transmit to a user equipment (UE), by a base station, a radio resource control (RRC) message comprising an indication of a uplink group of the UE, the uplink group associated with one or more uplink subframes, receive, from the UE, uplink control information for the one or more uplink subframes associated with the indicated uplink group of the UE, and receive unscheduled uplink data during at least one of the one or more of the uplink subframes based at least in part on the uplink group of the UE is assigned and the uplink control information.

A non-transitory computer readable medium for wireless communication is described. The non-transitory computer-readable medium may include instructions operable to cause a processor to transmit to a user equipment (UE), by a base station, a radio resource control (RRC) message comprising an indication of a uplink group of the UE, the uplink group associated with one or more uplink subframes, receive, from the UE, uplink control information for the one or more uplink subframes associated with the indicated uplink group of the UE, and receive unscheduled uplink data during at least one of the one or more of the uplink subframes based at least in part on the uplink group of the UE is assigned and the uplink control information.

Some examples of the method, apparatus, and non-transitory computer-readable medium described above may further include processes, features, means, or instructions for transmitting downlink control information to the UE. Some examples of the method, apparatus, and non-transitory computer-readable medium described above may further include processes, features, means, or instructions for receiving the unscheduled uplink data based at least in part on a frame structure and an uplink subframe type associated with the downlink control information.

Some examples of the method, apparatus, and non-transitory computer-readable medium described above may further include processes, features, means, or instructions for receiving uplink capability information of the UE.

In some examples of the method, apparatus, and non-transitory computer-readable medium described above, the indication of the uplink group of the UE comprises an explicit identification of the uplink group of the UE.

In some examples of the method, apparatus, and non-transitory computer-readable medium described above, the uplink group may be identified based at least in part on a number of uplink subframes and a number of repetitions for the unscheduled uplink data.

Some examples of the method, apparatus, and non-transitory computer-readable medium described above may further include processes, features, means, or instructions for receiving a measurement report from the UE. Some examples of the method, apparatus, and non-transitory computer-readable medium described above may further include processes, features, means, or instructions for associating the UE with the uplink group based at least in part on the measurement report.

In some examples of the method, apparatus, and non-transitory computer-readable medium described above, the uplink control information comprises one or more of: a new data indicator, a redundancy version, a hybrid automatic repeat request (HARM) identifier, a UE identifier, a number of repetitions for uplink control data, and a number of repetitions for the unscheduled uplink data.

In some examples of the method, apparatus, and non-transitory computer-readable medium described above, the uplink control information comprises an indication of resource blocks associated with the unscheduled uplink data.

In some examples of the method, apparatus, and non-transitory computer-readable medium described above, the resource blocks associated with the unscheduled uplink data comprise a subset of a total number of resource blocks allocated to the UE for the unscheduled uplink data in the RRC message.

DETAILED DESCRIPTION

Wireless communications systems operating in a shared radio frequency band, such as an unlicensed or other contention-based radio frequency band, may utilize frequency hopping techniques to decrease the effects of narrowband interference. However, regulations may limit the duty cycle such that the base station has insufficient resources to schedule all user equipment (UE) uplink (UL) traffic in the communications network. For example, a communications network may include a number of enhanced machine type communications (eMTC) devices that transmit a large number of small uplink packets.

In order to more efficiently use the available resources, a base station may use radio resource control (RRC) messaging to semi-statically configure grantless uplink parameters for a UE, including an uplink group of the UE and a portion of uplink subframes that may be used for unscheduled data transmission by the UEs belonging to the uplink group. Additionally, the base station may transmit downlink control information to the UE to indicate a number of uplink and downlink subframes in a frame structure. The UE may use the semi-statically configured parameters and the indicated number of downlink and uplink subframes in the frame structure to identify subframes that may be used for unscheduled data transmissions, such as grantless data transmissions, in a current frame.

The UEs may transmit grantless uplink control information in response to the downlink control information. The grantless uplink control data may include, among other things, a number of repetitions for the grantless uplink control information and a number of repetitions for the grantless uplink data. The UEs may also transmit grantless uplink data based on the downlink control information. Such a scheme may improve the efficiency of the network as opposed to a scheme in which the base station schedules every transmission.

Aspects of the disclosure are initially described in the context of a wireless communications system. Aspects of the disclosure are further illustrated by and described with reference to apparatus diagrams, system diagrams, and flowcharts that relate to grantless uplink transmission for eMTC-U. While the principles of this disclosure are described in the context of grantless uplink transmissions for eMTC-U for ease of explanation, it will be readily apparent that these principles may be applied to other types of unscheduled uplink transmissions over shared or unlicensed radio frequency spectrum bands.

Figure 1:
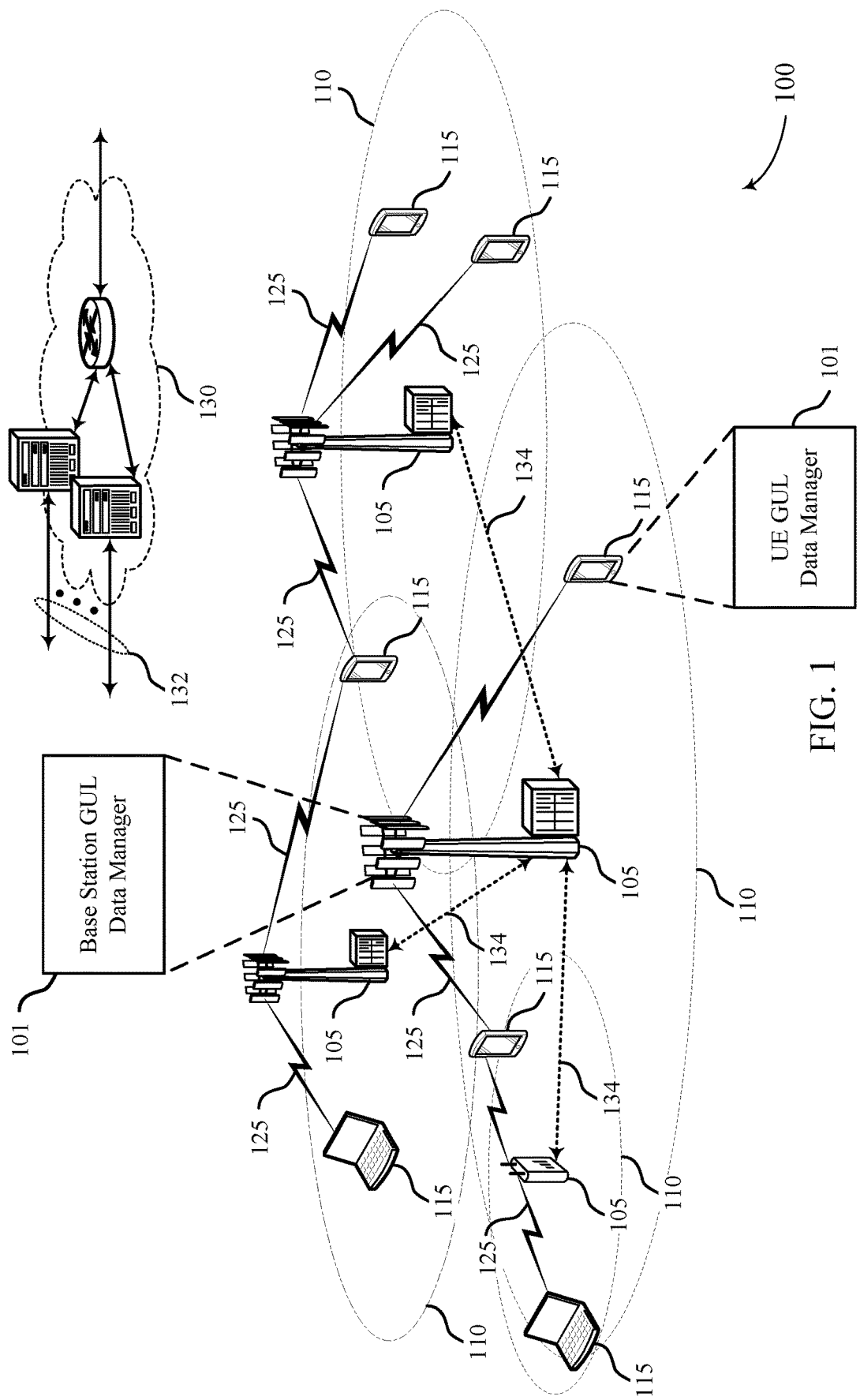
FIG. 1 illustrates an example of a system for wireless communication that supports grantless uplink transmission for an enhanced machine type communication (eMTC) over an unlicensed radio frequency spectrum band (eMTC-U) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) (including enhanced machine type communication (eMTC)) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as one or more base stations 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

One or more base stations 105 may include a base station grantless uplink data manager 101, which may be configured to transmit a radio resource control (RRC) message to the UE 115. The RRC message may include an indication of a grantless uplink group of the UE 115, with the grantless uplink group being associated with one or more grantless uplink subframes. In some examples, the base station 105 may identify available grantless uplink subframes within a frame. The base station 105 may partition the available grantless uplink subframes into two or more grantless uplink groups. Each UE 115 with grantless uplink capability may be assigned to one of the two or more grantless uplink groups based at least in part on a signal strength indicator received from the UE 115.

The base station grantless uplink data manager 101 may also receive uplink control information for the one or more grantless uplink subframes associated with the indicated uplink group of the UE 115. The uplink control information may include a number of repetitions for the uplink control information and a number of repetitions for the grantless uplink data.

The base station grantless uplink data manager 101 may also receive grantless uplink data during at least one of the one or more grantless uplink subframes based at least in part on the indicated uplink group of the UE 115 and the uplink control information.

UEs 115 may include a UE grantless uplink data manager 102, which may receive a RRC message including an indication of a grantless uplink group of the UE. The grantless uplink group may be associated with one or more grantless uplink subframes. The UE grantless uplink data manager 102 may also transmit uplink control information for the one or more grantless uplink subframes associated with the indicated uplink group. The UE grantless uplink data manager 102 may also transmit grantless uplink data during at least one of the one or more grantless uplink subframes based at least in part on the grantless uplink group and the downlink control information.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, other network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
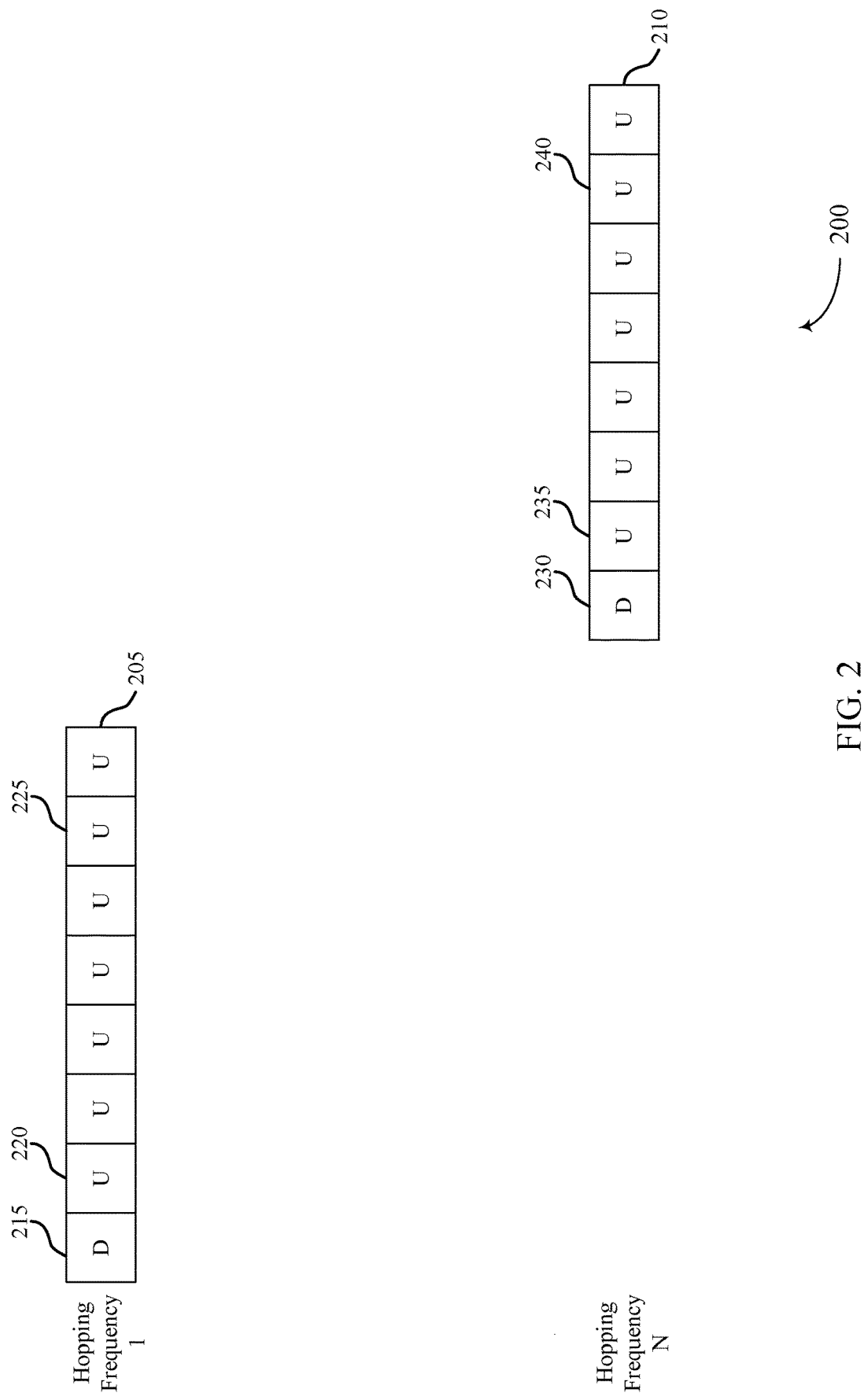
FIG. 2 illustrates an example of a superframe that may be used in a wireless communications system that supports grantless uplink transmission for eMTC-U in accordance with aspects of the present disclosure.

FIG. 2 illustrates an example of a superframe 200 in a wireless communications system that supports grantless uplink transmission for EMTC-U in accordance with various aspects of the present disclosure. In some examples, the wireless communications system may implement aspects of wireless communications system 100. The superframe 200 may include grantless uplink (GUL) transmissions over N different hopping frequencies.

The superframe 200 may include a number of frames including a first frame 205 and a second frame 210. In some examples, a UE may transmit during a frame on a first hopping frequency (e.g., during the first frame 205), and then pseudo-randomly hop to a second hopping frequency and transmit during a frame on the second hopping frequency (e.g., the second frame 210). The first frame 205 may include first downlink control subframes 215, first scheduled uplink subframes 220, and first grantless uplink subframes 225. The second frame 210 may include second downlink control subframes 230, second scheduled uplink subframes 235, and second grantless uplink subframes 240. Grantless uplink subframes may also be referred to as unscheduled uplink subframes. Each cell in the first frame 205 and the second frame 210 may represent five subframes, with each subframe having a duration of 5 milliseconds.

Prior to the start of the superframe 200, the base station may transmit a radio resource control (RRC) message to a UE. The RRC message may semi-statically configure grantless uplink parameters for the UE. The RRC message may identify an indication of the allocation of available uplink subframes between the first scheduled uplink subframes 220 and the first grantless uplink subframes 225. In some examples, the first grantless uplink subframes 225 may be the last k subframes in the first frame 205.

The RRC message may identify the grantless uplink groups within the first grantless uplink subframes 225. The base station may partition the first grantless uplink subframes 225 into one or more contiguous grantless uplink groups. Each grantless uplink group may be associated with a grantless uplink subframe type. The grantless uplink group may have a number of subframes. For example, a first grantless uplink group may have ten subframes corresponding to a length of ten milliseconds, and a second grantless uplink group may have twenty subframes corresponding to a length of twenty milliseconds. The grantless group may support a maximum repetition level (e.g., a maximum number of repetitions) based on the number of subframes. For example, the first grantless uplink group may support a maximum of ten repetitions, and the second grantless uplink group may support a maximum of twenty repetitions.

The RRC message may identify an association between a UE and one of the grantless uplink groups. The base station may receive capability information from each UE in the wireless communications system indicating whether the UE supports grantless uplink transmissions. Each UE that supports grantless uplink transmissions may be assigned to one of the one or more grantless uplink groups.

The base station may assign a UE to one of the one or more grantless uplink groups. The base station may assign the UE to one of the one or more grantless uplink groups based at least in part on the channel quality of the channel between the UE and the base station. For example, the base station may receive one or more measurement reports from the UE. The measurement reports may include a signal strength measurement. For example, the measurement reports may include reference signal received power (RSRP) or reference signal received quality (RSRQ). The base station may assign the UE to one of the grantless uplink groups based on one or more channel quality thresholds. For example, if the channel quality is above a channel quality threshold, the UE may be assigned to the first grantless uplink group that supports ten repetitions, and the UE may be assigned to the second grantless uplink group that supports twenty repetitions when the channel quality is below the channel quality threshold.

The RRC message may indicate a downlink control information format to monitor and which sets of bits correspond to an acknowledgement/negative acknowledgement (ACK/NACK) for the UE. The RRC message may also indicate which sets of bits correspond to other information such as transmit power control (TPC). The RRC message may also indicate a GERAN radio network temporary identifier (G-RNTI) that the UE must monitor to receive downlink messages. In some examples, multiple UEs may have the same group RNTI and the information for the UEs in the group may be multiplexed in one message.

With reference to the first frame 205, the first downlink control subframes 215 may include an indication of whether the first frame 205 allows grantless uplink transmissions. The first downlink control subframes 215 may also include an indication of the number of subframes reserved for downlink transmissions and the number of subframes available for uplink transmissions.

In some examples, the downlink control information may include an uplink acknowledgement bitmap. The uplink acknowledgement (ACK) bitmap may indicate whether grantless uplink transmissions have been acknowledged. In some examples, the uplink acknowledgement bitmap may provide support for a group acknowledgement after multiple grantless uplink transmissions in order to save base station overhead. In some examples, an entry in the uplink acknowledgement bitmap may be set to a negative acknowledgement (NACK) when the grantless uplink transmissions have been acknowledged.

The downlink control information may also include information about a modulation and coding scheme (MCS) and power control information. In some examples, UE will transmit grantless uplink data in accordance with the most recently received MCS and power control information.

In some examples, at least two different downlink control information formats may be used. For example, a DCI 1C format may be used when only one or two UEs in the communications network are configured to support grantless uplink transmissions. A DCI 0A/1A format may be used when a higher grantless uplink load is expected in the wireless communications system.

One or more UEs in the wireless communications system may transmit during the first scheduled uplink subframes 220 based at least in part on scheduling information provided by the base station.

The UEs may then transmit during the first grantless uplink subframes 225 based at least in part on the grantless uplink subframe information in the downlink control subframes 215 and the RRC message. In some examples, the UEs may transmit grantless uplink control information (G-UCI) to the base station. The physical channel on which the G-UCI is transmitted may be referred to as the grantless physical uplink control channel (G-PUCCH).

The G-UCI may include a new data indicator (NDI), a redundancy version (RV), a hybrid automatic repeat request (HARQ) identifier, and a UE identifier. In some examples, the UE identifier may be a cell radio network temporary identifier (C-RNTI). The G-UCI may also include a number of repetitions for the G-UCI and a number of repetitions for the grantless uplink data.

The G-UCI may include resource band (RB) allocation information. For example, the G-UCI may include an indication of the resource blocks associated with the grantless uplink data. In some examples, the indication of the resource blocks may be an indication of a subset of a total number of resource blocks allocated to the UE for the grantless uplink data in the RRC message.

The G-UCI may also include a buffer status report and periodic channel state information.

The UEs may transmit grantless uplink data in one or more subbands based at least in part on the information provided in the downlink control subframes 215 and the RRC message.

Figure 3:
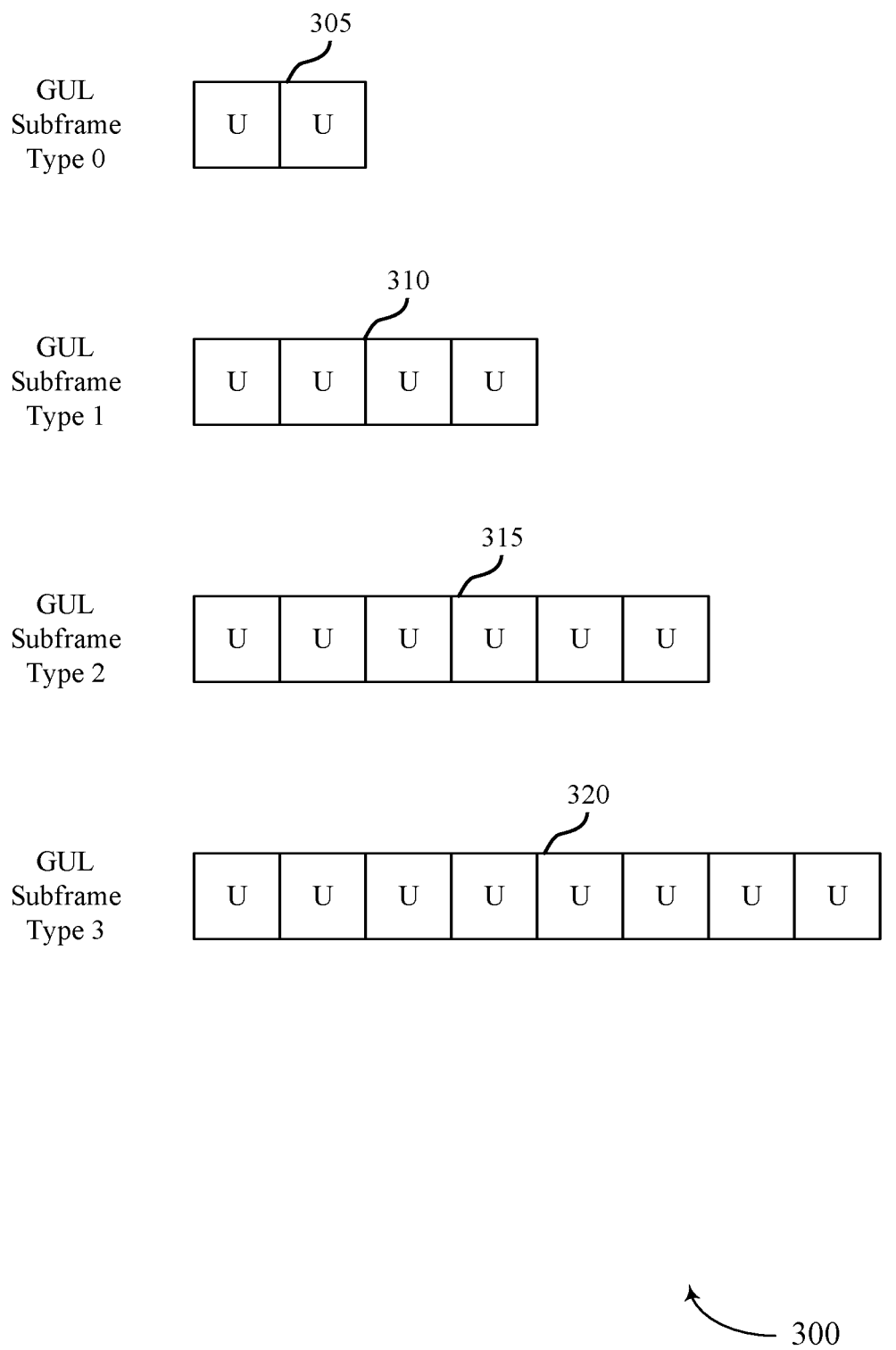
FIG. 3 illustrates an example of subframe types that may be used in a wireless communications system that supports grantless uplink transmission for eMTC-U in accordance with aspects of the present disclosure.

FIG. 3 illustrates an example of a subframe types 300 that may be used in a wireless communications system that supports grantless uplink transmission for EMTC-U in accordance with various aspects of the present disclosure. In some examples, the wireless communications system may implement aspects of wireless communications system 100. The subframe types 300 may include a first grantless uplink (GUL) subframe type 305, a second GUL subframe type 310, a third GUL subframe type 315, and a fourth GUL subframe type 320. Each cell in the subframe types may represent five subframes.

Each subframe type may each include one or more subframes, and each subframe may have a length of 1 millisecond. For example, first GUL subframe type 305 may have ten subframes corresponding to a length of 10 milliseconds, second GUL subframe type 310 may have twenty subframes corresponding to a length of 20 milliseconds, third GUL subframe type 315 may have thirty subframes corresponding to a length of 30 milliseconds, and fourth GUL subframe type 320 may have forty subframes corresponding to a length of 40 milliseconds. Each subframe type may support a number of repetitions. For example, first GUL subframe type 305 may support ten repetitions, the second GUL subframe type 310 may support twenty repetitions, third GUL subframe type 315 may support thirty repetitions, and fourth GUL subframe type 320 may support forty repetitions.

Each subframe type may also be associated with a location within a frame. For example, a fifth GUL subframe type (not shown) may have the same length as the first GUL subframe type 305, but may be associated with a different location within the frame. For example, the first GUL subframe type 305 may be associated with the first ten GUL subframes in a frame, while the fifth GUL subframe type may be associated with the last ten GUL subframes in a frame.

The subframe types may be identified based on a subframe type identifier. For example, the first GUL subframe type 305 may be associated with the identifier 0, the second GUL subframe type 310 may be associated with the identifier 1, the third GUL subframe type 315 may be associated with the identifier 2, and the fourth GUL subframe type 320 may be associated with the identifier 3. In this manner, any of the GUL subframe types shown in FIG. 3 may be transmitted using only two bits of control information. The subframe type identifiers may be included in the downlink control information to indicate when a UE may transmit.

Figure 4:
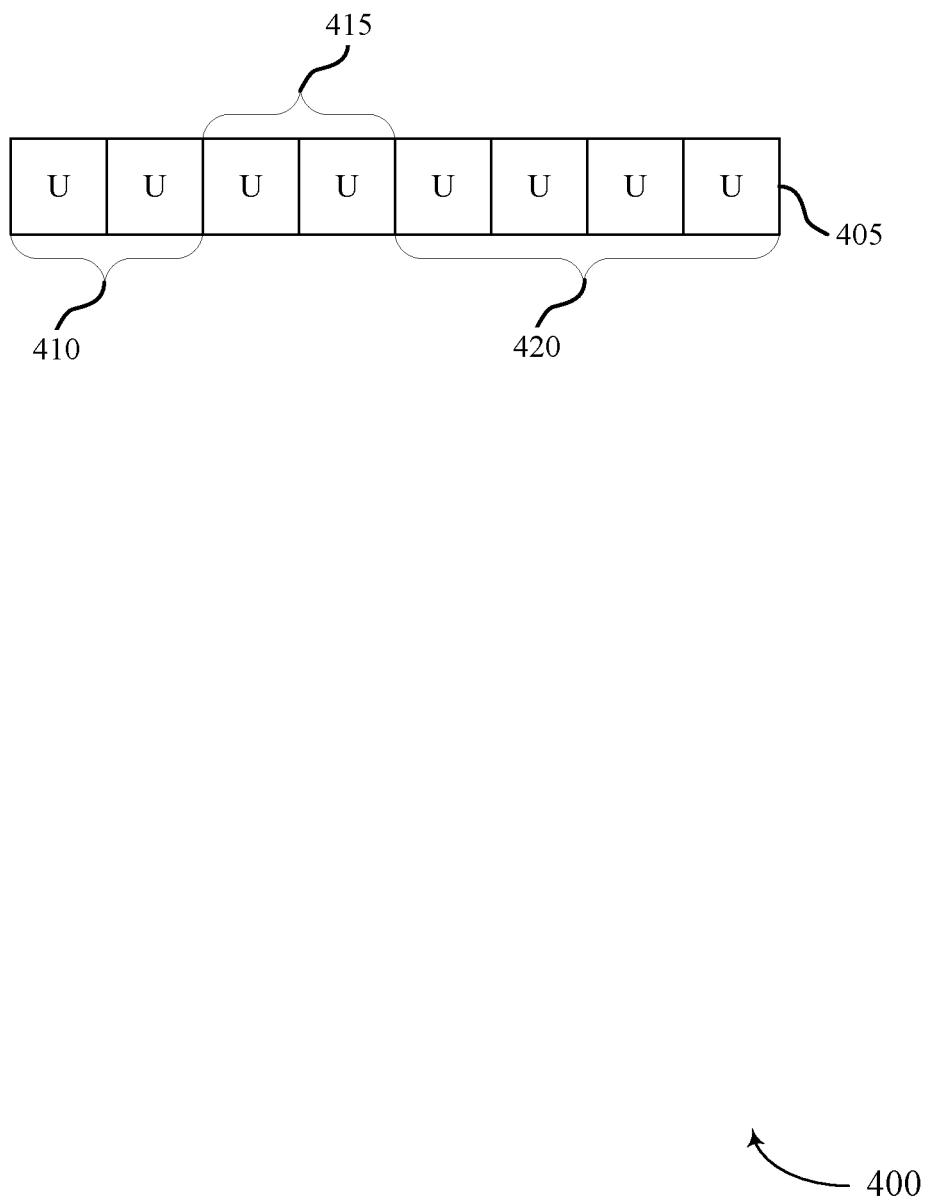
FIG. 4 illustrates an example of a grantless uplink partitioning scheme in a wireless communications system that supports grantless uplink transmission for eMTC-U in accordance with aspects of the present disclosure.

FIG. 4 illustrates an example of a grantless partitioning scheme 400 in a wireless communications system that supports grantless uplink transmission for EMTC-U in accordance with various aspects of the present disclosure. In some examples, the wireless communications system may implement aspects of wireless communications system 100.

Each cell in the GUL subframes 405 may represent five subframes, and each subframe may have a duration of 1 millisecond. The base station may partition the available grantless uplink subframes into two or more GUL groups. For example, the GUL subframes 405 may be partitioned into a first GUL group 410, a second GUL group 415, and a third GUL group 420. Each GUL group may be associated with a number of GUL subframes. For example, both the first GUL group 410 and the second GUL group 415 may have ten subframes with a corresponding length of 10 milliseconds, and the third GUL group 420 may have twenty subframes with a corresponding length of 20 milliseconds. Each GUL group may be associated with a different maximum repetition level (e.g., a different number of repetitions). For example, both the first GUL group 410 and the second GUL group 415 may support ten repetitions, and the third GUL group 420 may support twenty repetitions.

Figure 5:
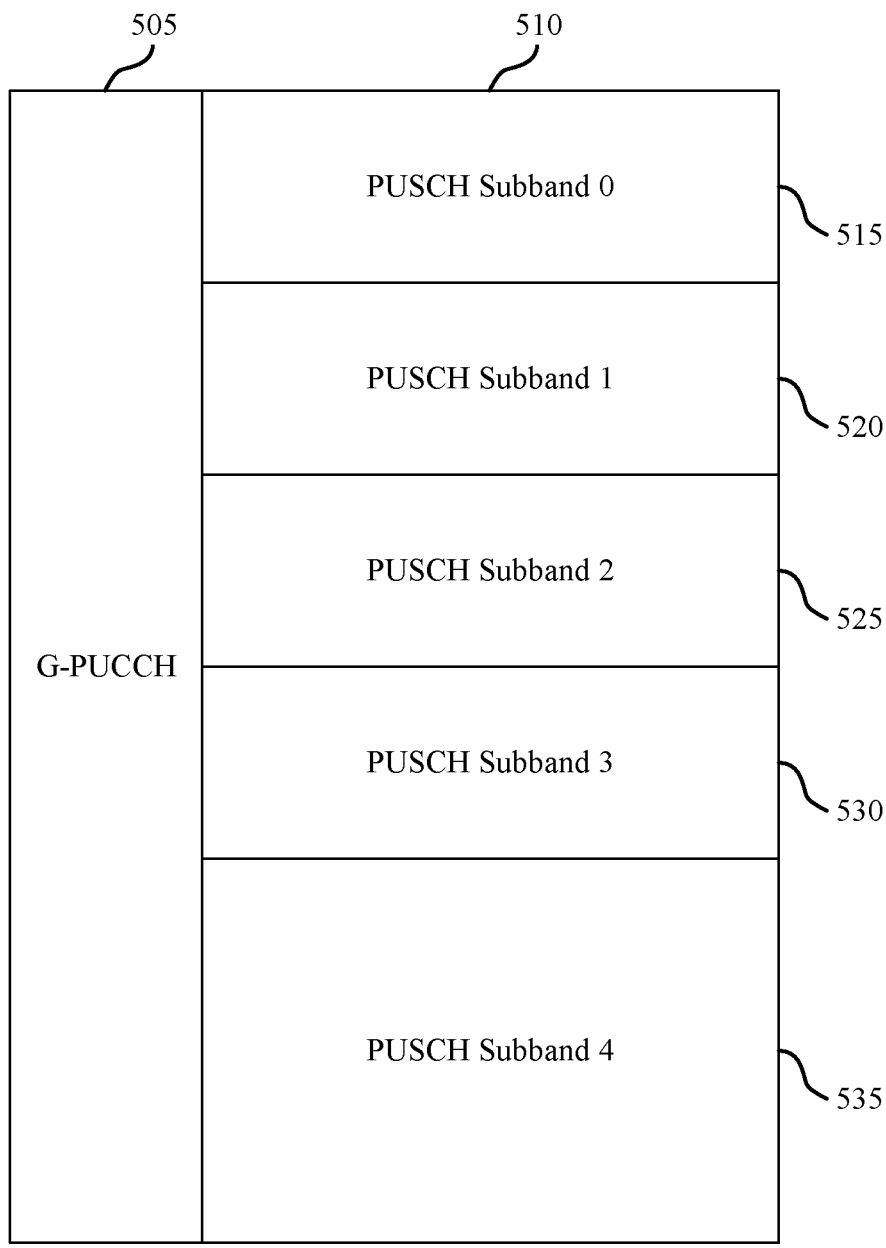
FIG. 5 illustrates an example of a resource block allocation scheme in a wireless communications system that supports grantless uplink transmission for eMTC-U in accordance with aspects of the present disclosure.

FIG. 5 illustrates an example of a resource block allocation scheme 500 in a wireless communications system that supports grantless uplink transmission for EMTC-U in accordance with various aspects of the present disclosure. In some examples, the wireless communications system may implement aspects of wireless communications system 100.

The resource block allocation scheme 500 may include a first time period 505 and a second time period 510. In the first time period 505, a UE may transmit grantless uplink control information (G-UCI) to a base station. The physical channel used to carry the G-UCI may be referred to as the grantless physical uplink control channel (G-PUCCH). Multiple grantless UEs may transmit G-UCI on the G-PUCCH during the first time period 505, e.g., by using a code division multiple access scheme.

The G-UCI may include NDI, RV, a HARQ identifier, and a UE identifier such as a C-RNTI. The G-UCI may also include a number of repetitions for the uplink control data and a number of repetitions for the grantless uplink data. In some examples, the G-UCI may include an identification of a subset of the resource blocks allocated to the UE in the RRC message.

During the second time period 510, UEs may transmit grantless uplink data on one or more subbands of the physical uplink shared channel (PUSCH). For example, the PUSCH may be divided into a PUSCH subband 0 515, a PUSCH subband 1 520, a PUSCH subband 2 525, a PUSCH subband 3 530, and a PUSCH subband 4 535. In some examples, the PUSCH may include six resource blocks. The first four subbands 515 through 530 may cover one resource block each, while the PUSCH subband 4 535 may cover two resource blocks. A UE may transmit grantless uplink data on one or more of the PUSCH subbands during the second time period 510 based at least in part on the GUL group to which the UE is assigned. For example, the UE may transmit grantless uplink data on one or more of the PUSCH subbands during the second time period 510 based at least in part on the resource block allocation identified in the RRC message or the resource block allocation identified in the G-UCI.

Figure 6:
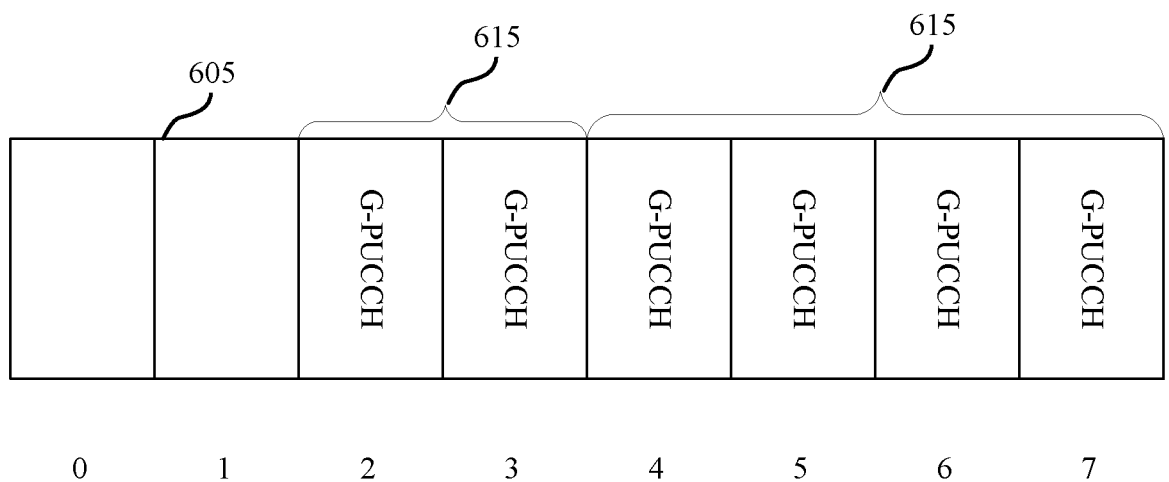
FIG. 6 illustrates an example of a repetition scheme in a wireless communications system that supports grantless uplink transmission for eMTC-U in accordance with aspects of the present disclosure.

FIG. 6 illustrates an example of a repetition scheme 600 in a wireless communications system that supports grantless uplink transmission for EMTC-U in accordance with various aspects of the present disclosure. In some examples, the wireless communications system may implement aspects of wireless communications system 100.

The repetition scheme 600 may include a plurality of G-UCI subframes 605. The UEs in the wireless communications system may G-UCI with a number of repetitions in the plurality of G-UCI subframes. In some examples, the number of repetitions may be based at least in part on signal strength measurements such as RSRP or RSRQ. In some examples, the number of repetitions may be based at least in part on base station signaling. For example, the base station may explicitly indicate (e.g., in downlink control information) how many repetitions each UE may transmit. In some other examples, the base station may transmit an offset and the UE may determine the number of repetitions based at least in part on the offset.

The starting location for the G-UCI may be based at least in part on the number of repetitions. In some examples, the first G-UCI subframe may be transmitted at the subframe whose index corresponds to the number of repetitions, or a multiple thereof. In some other examples, the first G-UCI subframe may be transmitted at the first subframe. For example, G-UCI subframes 610 have two repetitions, and the first of the G-UCI subframes 610 may be transmitted in the first G-UCI subframe (corresponding to index 0) or the third G-UCI subframe (corresponding to index 2) in the plurality of G-UCI subframes 605. Similarly, G-UCI subframes 615 may have four repetitions, and the first of the G-UCI subframes 615 may be transmitted in the first G-UCI subframe (corresponding to index 0) or the fifth G-UCI subframe (corresponding to index 4) in the plurality of G-UCI subframes 605. Such a repetition scheme may decrease the search complexity for the base station.

Figure 7:
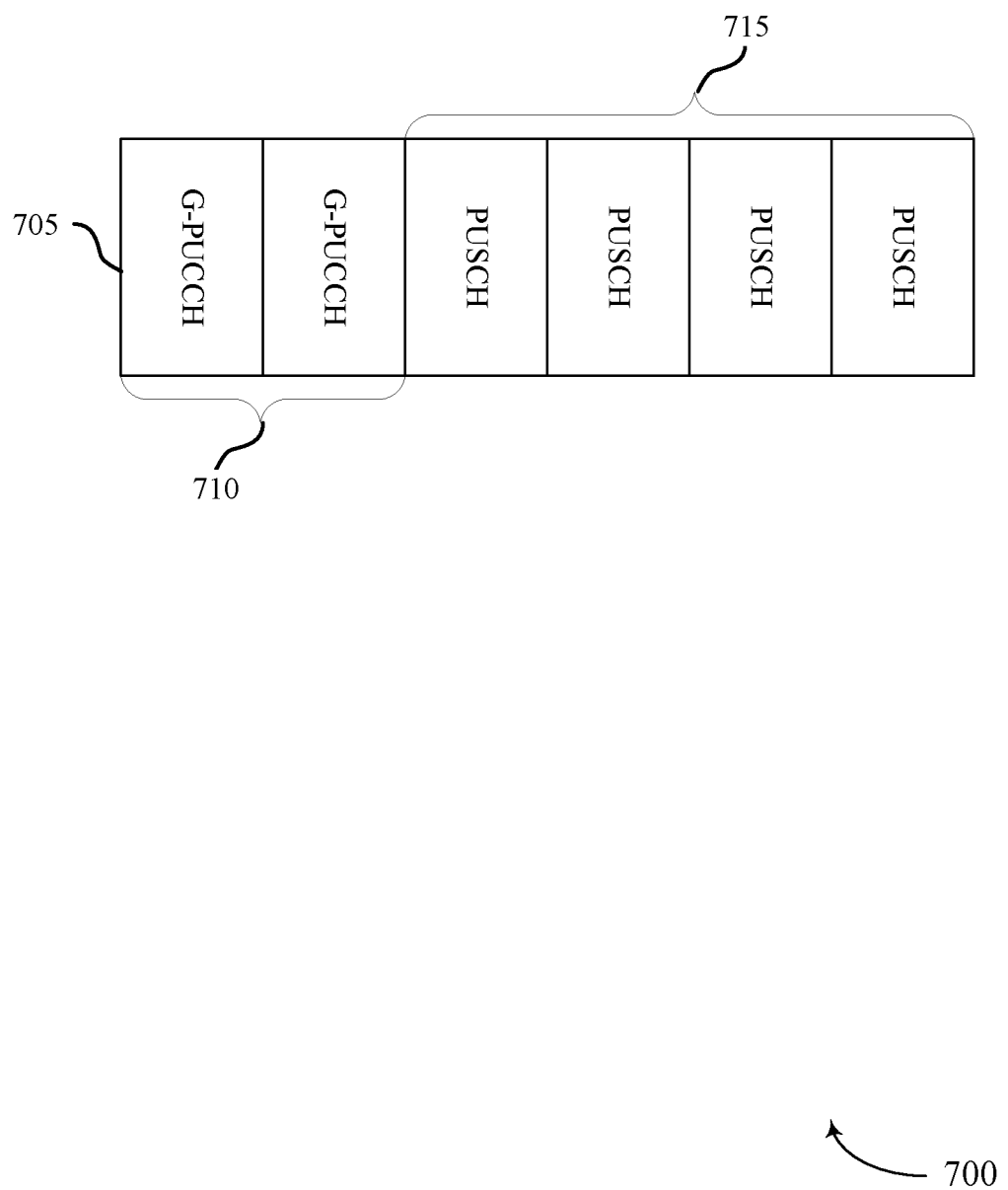
FIG. 7 illustrates an example of a user equipment transmission scheme in a wireless communications system that supports grantless uplink transmission for eMTC-U in accordance with aspects of the present disclosure.

FIG. 7 illustrates an example of a UE transmission scheme 700 in a wireless communications system that supports grantless uplink transmission for EMTC-U in accordance with various aspects of the present disclosure. In some examples, the wireless communications system may implement aspects of wireless communications system 100.

The UE transmission scheme 700 may illustrate the transmissions from a UE during grantless uplink subframes 705. The UE may be an example of UE 115 as described with reference to FIG. 1. The grantless uplink subframes 705 may include uplink control subframes 710 and GUL data subframes 715.

The uplink control subframes 710 may be transmitted during a first time period such as first time period 505 described with reference to FIG. 5. The uplink control subframes 710 may include two repetitions of G-UCI subframes.

The UE may then transmit grantless uplink data in GUL data subframes 715 during a second time period. The second time period may be an example of aspects of second time period 510 as described with reference to FIG. 5. The GUL data subframes 715 may include four repetitions of GUL data.

Figure 8:
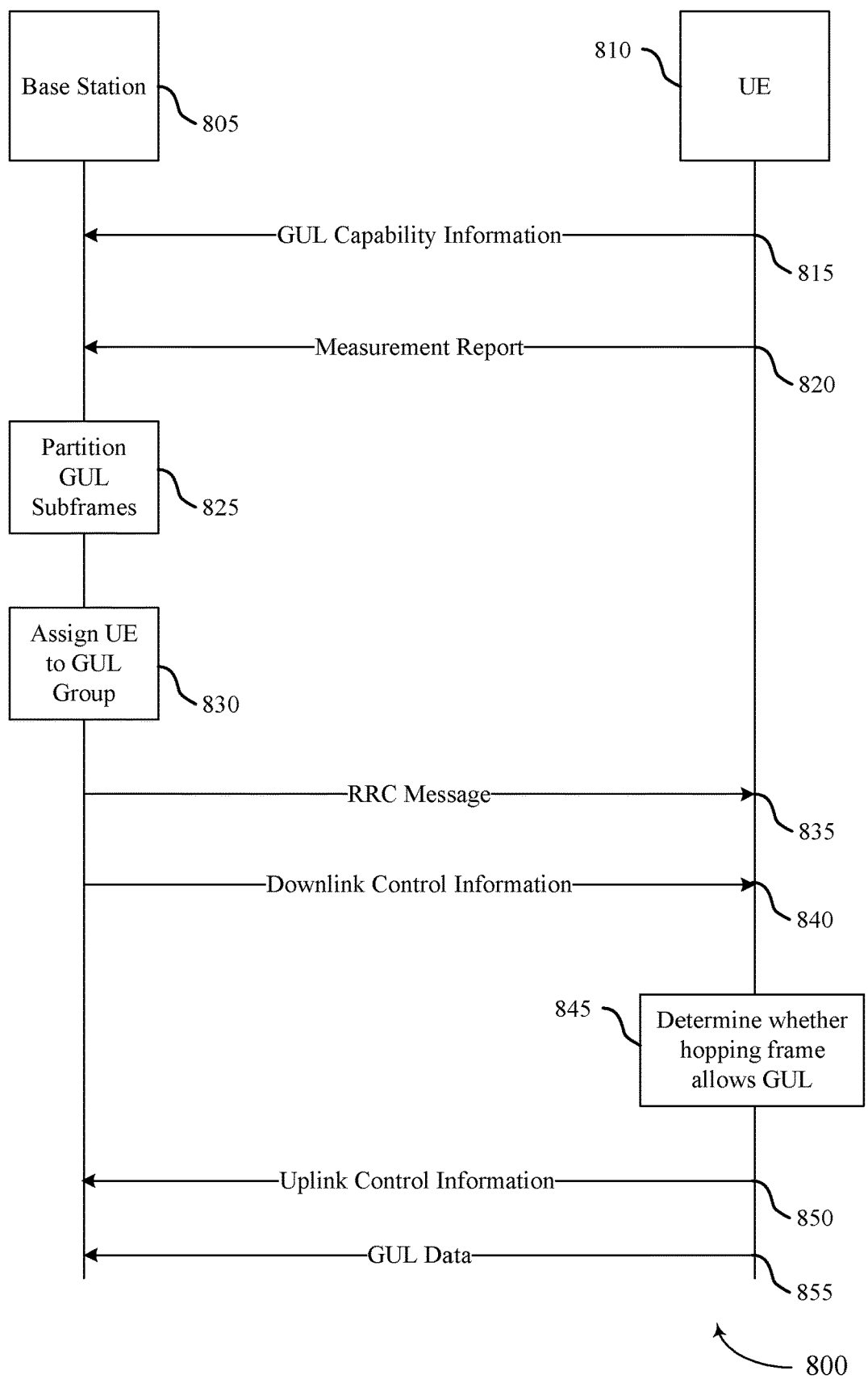
FIG. 8 illustrates an example of a flow diagram for a wireless communications system that supports grantless uplink transmission for eMTC-U in accordance with aspects of the present disclosure.

FIG. 8 illustrates an example of a flow diagram 800 in a wireless communications system that supports grantless uplink transmission for EMTC-U in accordance with various aspects of the present disclosure. In some examples, the wireless communications system may include a base station 805 and a UE 810. The base station 805 and UE 810 may be examples of aspects of base station 105 and UE 115 as described with reference to FIG. 1.

UE 810 may transmit GUL capability information 815 to base station 805. The GUL capability information 815 may indicate that UE 810 supports GUL. The base station 805 may add UE 810 to a list of UEs that support GUL.

UE 810 may transmit one or more measurement reports 820 to the base station 805. The measurement reports 820 may include a signal strength measurement. For example, the measurement reports 820 may include a reference signal received power (RSRP) measurement, a reference signal received quality (RSRQ) measurement, or a combination thereof.

The base station 805 may partition the GUL subframes into one or more GUL groups at 825. The base station 805 may partition the GUL subframes based at least in part on the number of UEs that support GUL. Each GUL group may have a number of subframes with a corresponding length. For example, one of the GUL groups may have two GUL subframes with a corresponding length of 10 milliseconds. Each GUL group may also support a maximum repetition level (e.g., a maximum number of repetitions).

The base station 805 may assign the UE 810 to one of the GUL groups at 830. The base station 805 may be assigned to one of the GUL groups based at least in part on the measurement reports 820. For example, UEs that have weaker channels may be assigned to GUL groups that support a greater number of repetitions.

The base station 805 may transmit a RRC message 835 to the UE 810. The RRC message 835 may semi-statically configure grantless uplink parameters for the UE 810. In some examples, the RRC message 835 may identify the number k of GUL subframes in the hopping frames. The RRC message 835 may identify the number of GUL groups and the size of each GUL group. For example, the RRC message 835 may include an identification of the uplink group of the UE 810 and a portion of uplink subframes that may be used for unscheduled (grantless) data transmissions by UEs belonging to the uplink group.

The base station 805 may transmit downlink control information 840 to the UE 810. The downlink control information 840 may include an indication of whether the current hopping frame allows GUL. The downlink control information 840 may also include an indication of the number of downlink and uplink subframes in a frame structure.

The UE 810 may determine whether a hopping frame allows GUL at 845. For example, the UE 810 may check the downlink control information 840 to determine whether the hopping frame allows GUL. In some examples, the UE 810 may receive the downlink control information over a common physical downlink control channel (C-PDCCH).

The UE 810 may transmit uplink control information 850 to the base station 805. The uplink control information 850 may be referred to as grantless uplink control information (G-UCI). The uplink control information 850 may include a new data indicator, a redundancy version, a hybrid automatic repeat request (HARD) identifier, and a UE identifier. The UE identifier may be, for example, a cell radio network temporary identifier (C-RNTI). The uplink control information 850 may include a number of repetitions for the G-PUCCH and a number of repetitions for the PUSCH.

In some examples, the uplink control information 850 may also include a resource block allocation. The resource block allocation may be an indication of resource blocks associated with the grantless uplink data. For example, the resource blocks associated with the grantless uplink data may be a subset of the total number of resource blocks allocated to the UE 810 for the grantless uplink data in the RRC message 835.

In some examples, the resource block allocation may indicate that the UE 810 only intends to use a portion of the allotted frequency for a particular subband. In some other examples, the resource block allocation may indicate that the UE 810 only intends to use a portion of the allotted time for a particular subband. In some examples, this scheme may decrease the likelihood of UE collisions.

The UE 810 may transmit GUL data 855 to the base station 805. The UE 810 may transmit GUL data 855 to the base station 805 based at least in part on the GUL group to which the UE 810 is assigned as indicated in the RRC message 835.

Figure 9:
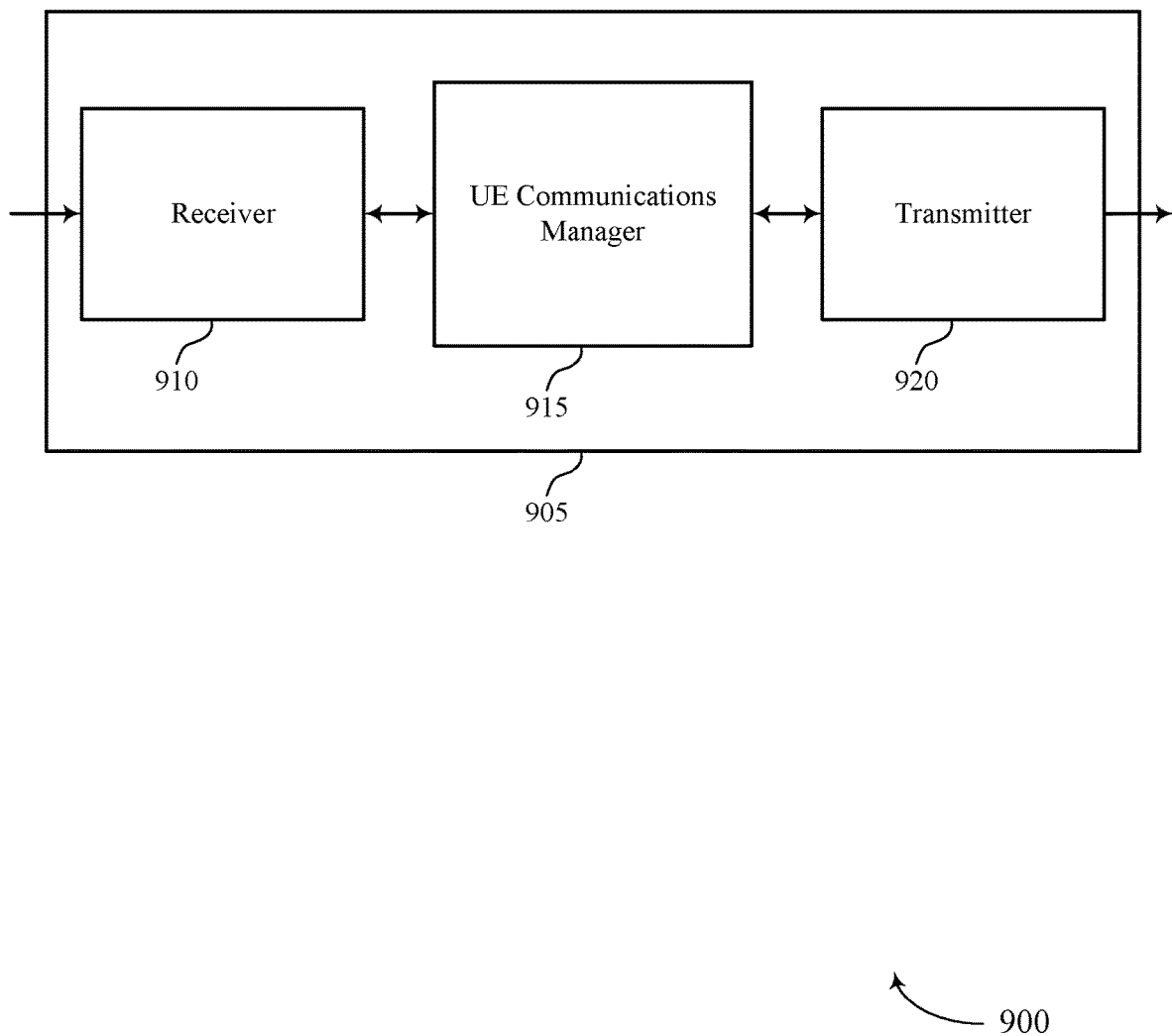
FIGS. 9 through 11 show block diagrams of a device that supports grantless uplink transmission for eMTC-U in accordance with aspects of the present disclosure.

FIG. 9 shows a block diagram 900 of a wireless device 905 that supports grantless uplink transmission for EMTC-U in accordance with aspects of the present disclosure. Wireless device 905 may be an example of aspects of a user equipment (UE) 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to grantless uplink transmission for EMTC-U, etc.). Information may be passed on to other components of the device. The receiver 910 may be an example of aspects of the transceiver 1235 described with reference to FIG. 12. The receiver 910 may utilize a single antenna or a set of antennas.

Receiver 910 may receive downlink control information from a base station. In some cases, the uplink group of the UE is identified based on a number of uplink subframes and a number of repetitions for the unscheduled uplink data. In some cases, the UE is associated with the uplink group based on the measurement report.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, at a UE, a radio resource control (RRC) message including an indication of a uplink group of the UE, the uplink group associated with one or more uplink subframes, transmit, by the UE, uplink control information for the one or more uplink subframes associated with the indicated uplink group of the UE, and transmit unscheduled uplink data during at least one of the one or more uplink subframes based on the uplink group of the UE and the uplink control information.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Transmitter 920 may transmit uplink capability information of the UE to a base station. In some cases, the unscheduled uplink data is transmitted using the frequency subband of the system bandwidth during the at least one of the one or more uplink subframes. In some cases, the indication of the uplink group of the UE includes an explicit identification of the uplink group of the UE.

Figure 10:
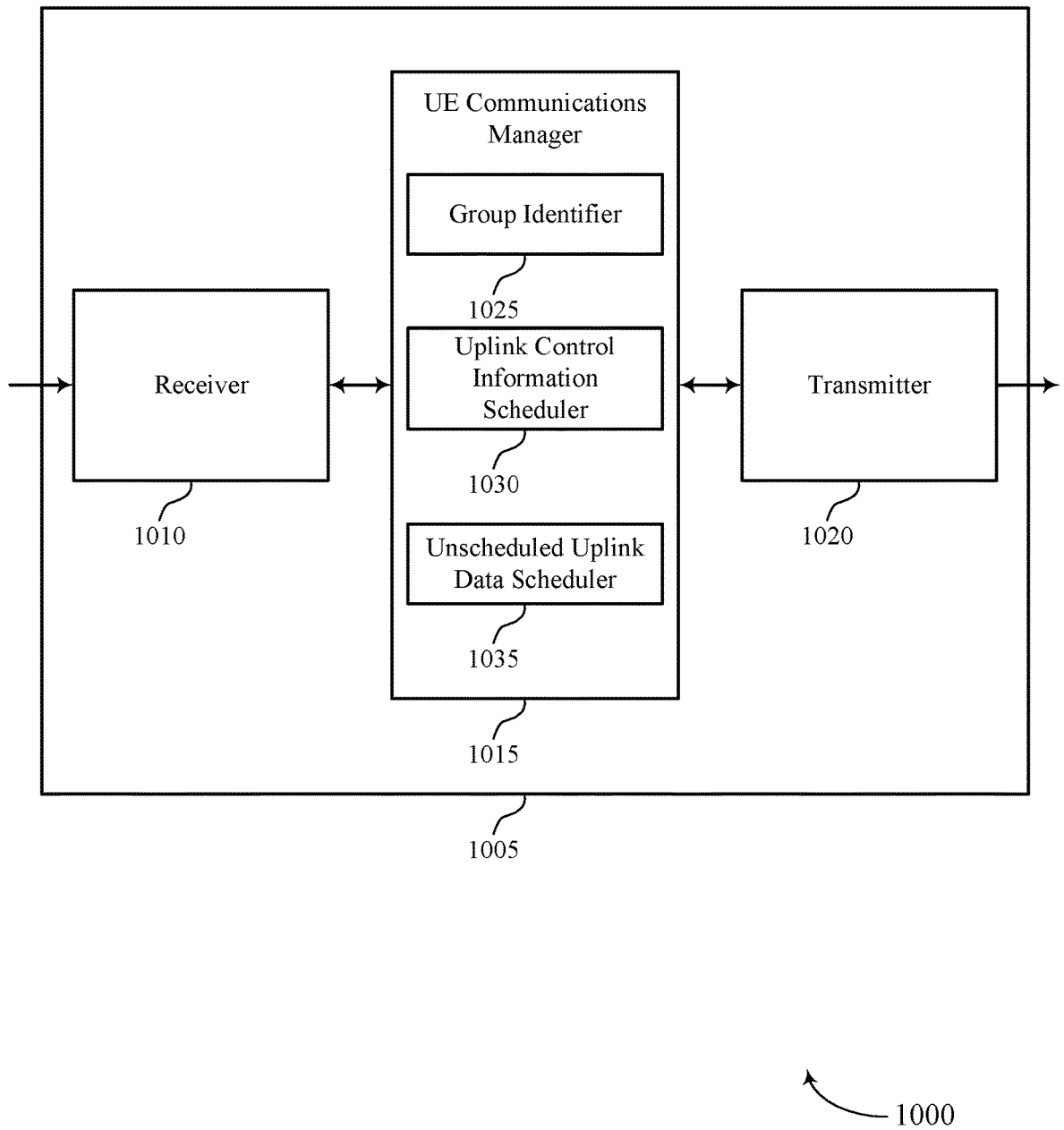

FIG. 10 shows a block diagram 1000 of a wireless device 1005 that supports grantless uplink transmission for EMTC-U in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to grantless uplink transmission for EMTC-U, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include group identifier 1025, uplink control information scheduler 1030, and unscheduled uplink data scheduler 1035.

Group identifier 1025 may receive, at a UE, a RRC message including an indication of a uplink group of the UE, the uplink group associated with one or more uplink subframes.

Uplink control information scheduler 1030 may transmit, by the UE, uplink control information for the one or more uplink subframes associated with the indicated uplink group of the UE and determine, based on the RRC message, a set of uplink resources for the uplink control information for the one or more uplink subframes.

Unscheduled uplink data scheduler 1035 may transmit unscheduled uplink data during at least one of the one or more uplink subframes based on the uplink group of the UE and the uplink control information, determine a frequency subband of a system bandwidth based on the uplink group of the UE, determine, based on the RRC message, a resource block allocation to the UE for the unscheduled uplink data, transmit the unscheduled uplink data during the at least one of the one or more uplink subframes is further based on the determined frame structure and the uplink subframe type, and transmit the unscheduled uplink data during the at least one of the one or more uplink subframes is further based on the determination that the unscheduled uplink data transmission is permissible during the current frame. In some cases, the resource block allocation to the UE is a subset of a total set of resource blocks associated with the frequency subband, and the unscheduled uplink data is transmitted using the resource block allocation during the at least one of the one or more uplink subframes.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
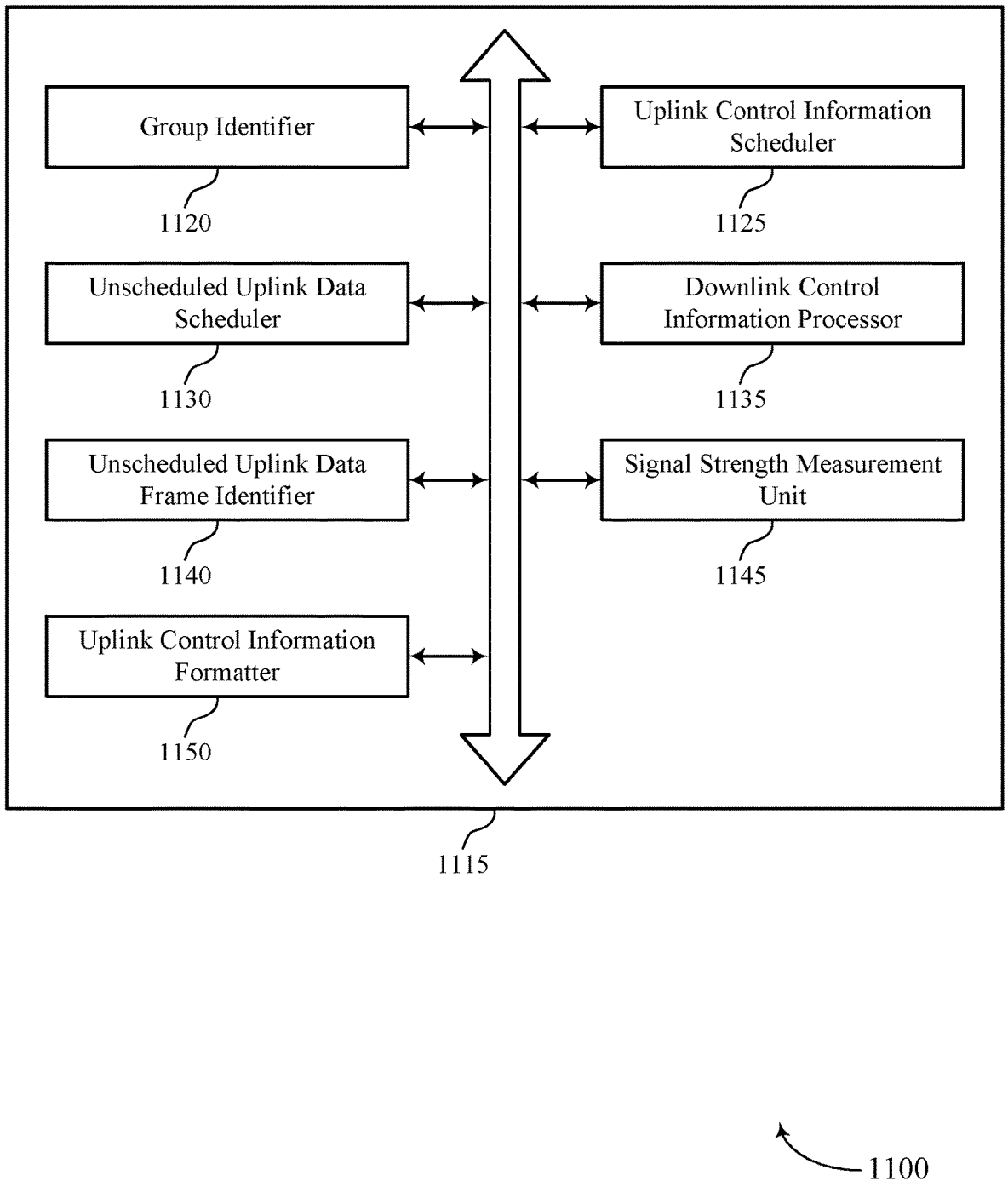

FIG. 11 shows a block diagram 1100 of a UE communications manager 1115 that supports grantless uplink transmission for EMTC-U in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include group identifier 1120, uplink control information scheduler 1125, unscheduled uplink data scheduler 1130, downlink control information processor 1135, unscheduled uplink data frame identifier 1140, signal strength measurement unit 1145, and uplink control information formatter 1150. Each of these modules may communicate, directly or indirectly, with one another (e.g., via one or more buses).

Group identifier 1120 may receive, at a UE, a RRC message including an indication of a uplink group of the UE, the uplink group associated with one or more uplink subframes.

Uplink control information scheduler 1125 may transmit, by the UE, uplink control information for the one or more uplink subframes associated with the indicated uplink group of the UE and determine, based on the RRC message, a set of uplink resources for the uplink control information for the one or more uplink subframes.

Unscheduled uplink data scheduler 1130 may transmit unscheduled uplink data during at least one of the one or more uplink subframes based on the uplink group of the UE and the uplink control information, determine a frequency subband of a system bandwidth based on the uplink group of the UE, determine, based on the RRC message, a resource block allocation to the UE for the unscheduled uplink data, transmit the unscheduled uplink data during the at least one of the one or more uplink subframes is further based on the determined frame structure and the uplink subframe type, and transmit the unscheduled uplink data during the at least one of the one or more uplink subframes is further based on the determination that the unscheduled uplink data transmission is permissible during the current frame. In some cases, the resource block allocation to the UE is a subset of a total set of resource blocks associated with the frequency subband, and the unscheduled uplink data is transmitted using the resource block allocation during the at least one of the one or more uplink subframes.

Downlink control information processor 1135 may determine, based on the downlink control information, a frame structure and an uplink subframe type for the unscheduled uplink data.

Unscheduled uplink data frame identifier 1140 may determine, based on the downlink control information, that an unscheduled uplink data transmission is permissible during a current frame.

Signal strength measurement unit 1145 may provide a measurement report to a base station.

Uplink control information formatter 1150 may determine the number of repetitions based on a signal strength measurement or signaling from a base station. In some cases, the uplink control information includes one or more of: a new data indicator, a redundancy version, a hybrid automatic repeat request (HARM) identifier, a UE identifier, a number of repetitions for uplink control information, and a number of repetitions for the unscheduled uplink data. In some cases, the uplink control information includes an indication of resource blocks associated with the unscheduled uplink data. In some cases, the resource blocks associated with the unscheduled uplink data include a subset of a total number of resource blocks allocated to the UE for the unscheduled uplink data in the RRC message.

Figure 12:
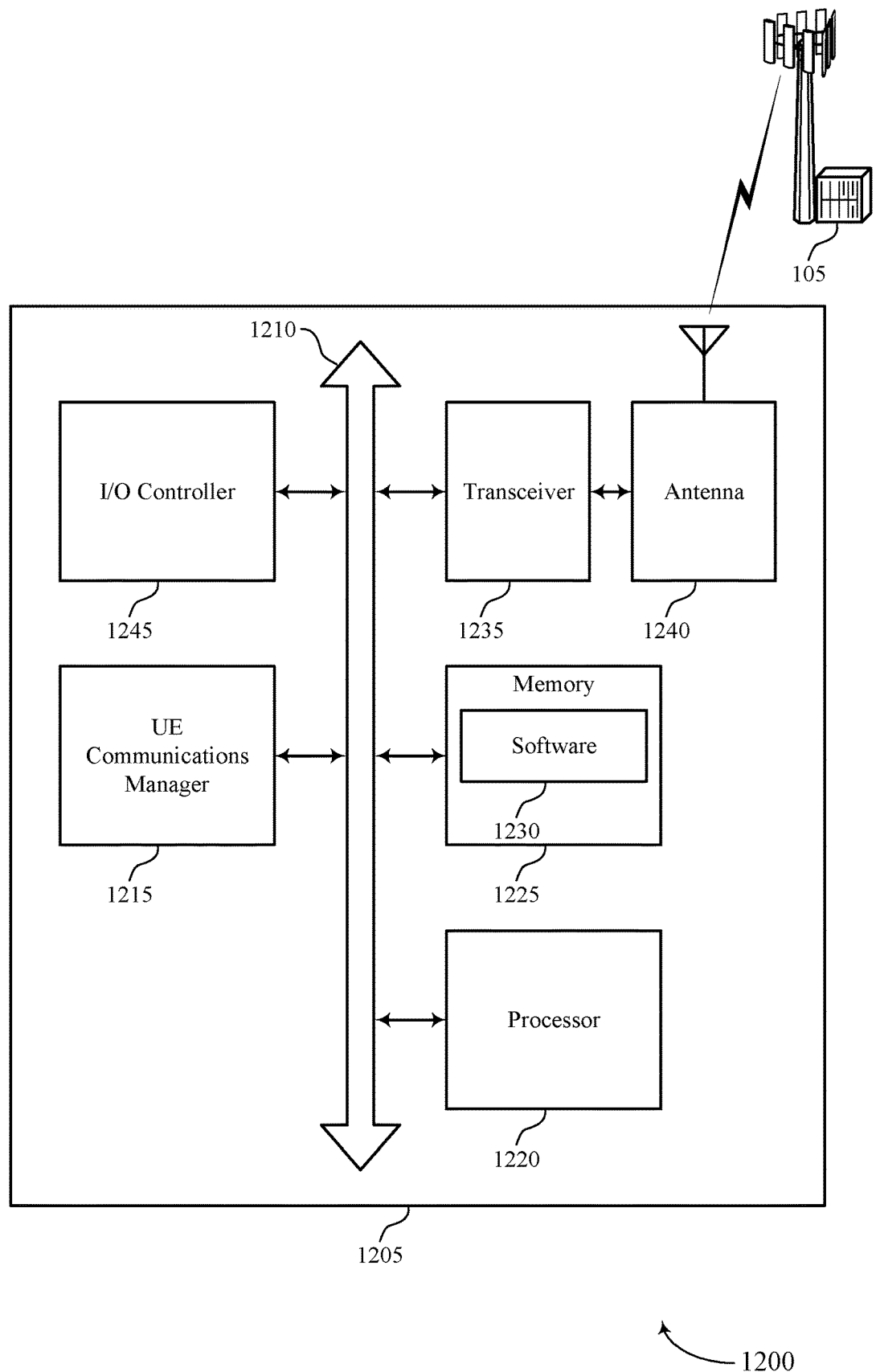
FIG. 12 illustrates a block diagram of a system including a UE that supports grantless uplink transmission for eMTC-U in accordance with aspects of the present disclosure.

FIG. 12 shows a diagram of a system 1200 including a device 1205 that supports grantless uplink transmission for EMTC-U in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting grantless uplink transmission for EMTC-U).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support grantless uplink transmission for EMTC-U. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
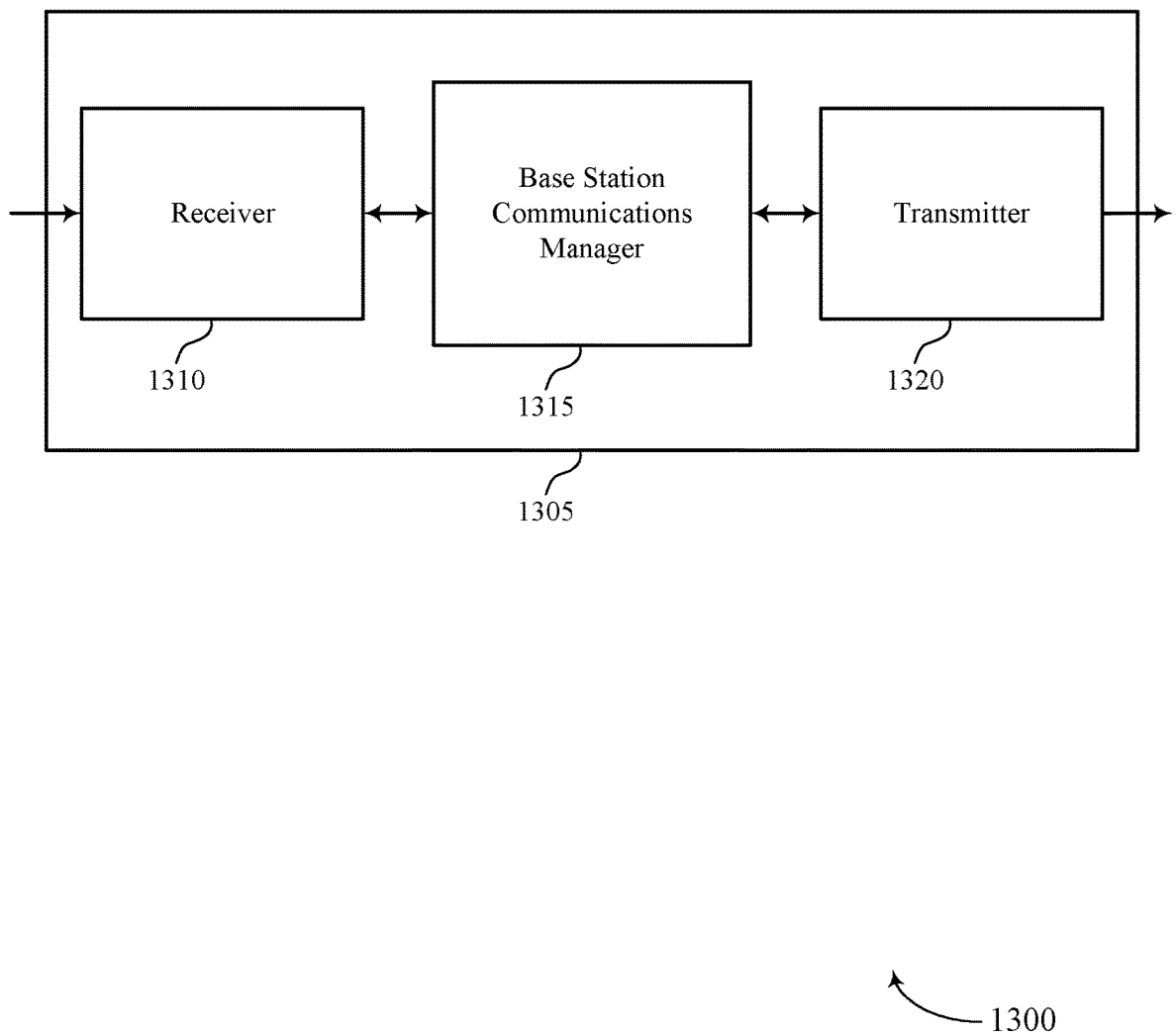
FIGS. 13 through 15 show block diagrams of a device that supports grantless uplink transmission for eMTC-U in accordance with aspects of the present disclosure.

FIG. 13 shows a block diagram 1300 of a wireless device 1305 that supports grantless uplink transmission for EMTC-U in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to grantless uplink transmission for EMTC-U, etc.). Information may be passed on to other components of the device. The receiver 1310 may be an example of aspects of the transceiver 1635 described with reference to FIG. 16. The receiver 1310 may utilize a single antenna or a set of antennas.

Receiver 1310 may receive the unscheduled uplink data based on a frame structure and an uplink subframe type associated with the downlink control information, receive uplink capability information of the UE, and receive a measurement report from the UE.

Base station communications manager 1315 may be an example of aspects of the base station communications manager 1615 described with reference to FIG. 16.

Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may transmit to a UE, by a base station, a RRC message including an indication of a uplink group of the UE, the uplink group associated with one or more uplink subframes, receive, from the UE, uplink control information for the one or more uplink subframes associated with the indicated uplink group of the UE, and receive unscheduled uplink data during at least one of the one or more of the uplink subframes based on the uplink group of the UE is assigned and the uplink control information.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
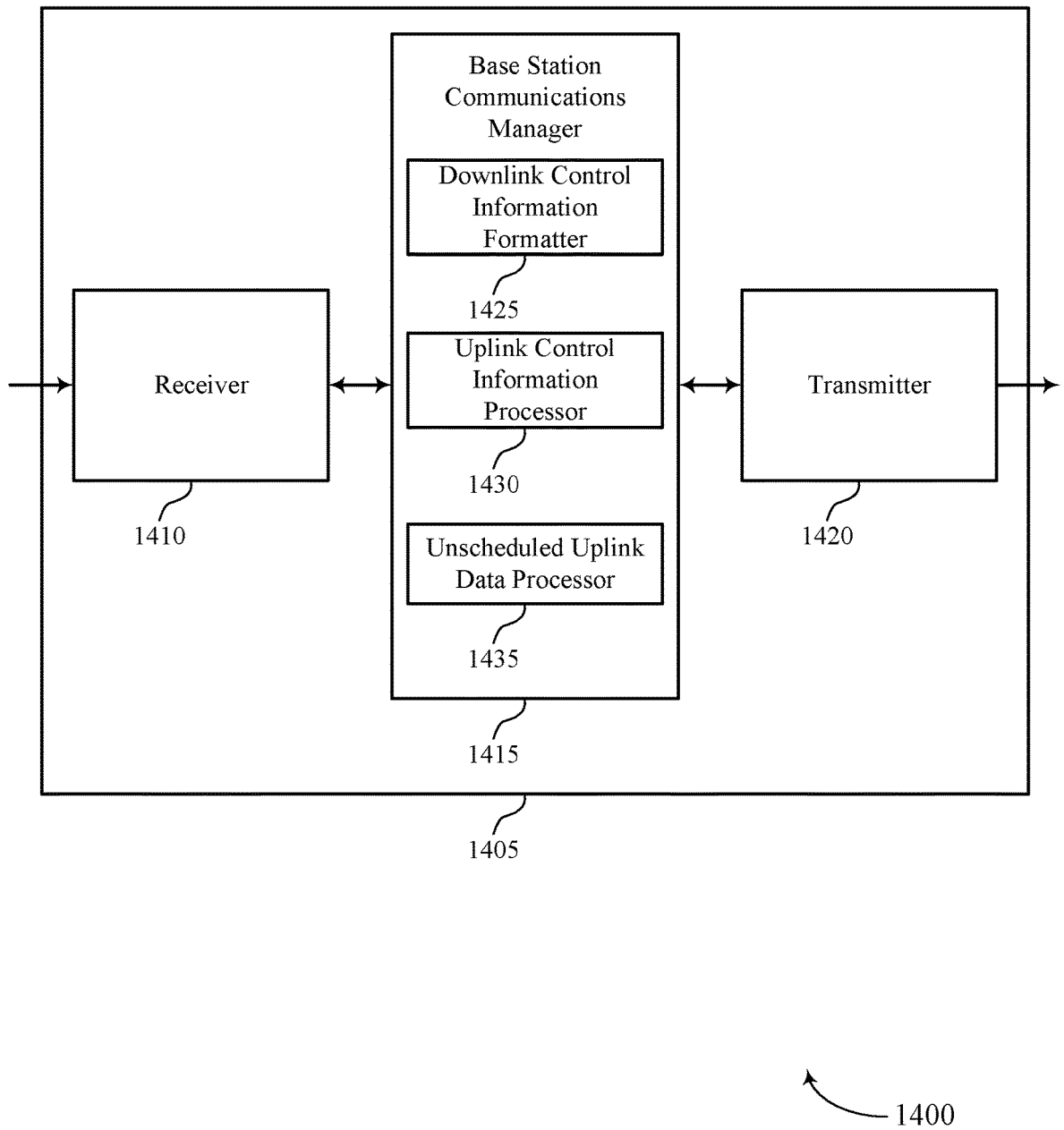

FIG. 14 shows a block diagram 1400 of a wireless device 1405 that supports grantless uplink transmission for EMTC-U in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to grantless uplink transmission for EMTC-U, etc.). Information may be passed on to other components of the device. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16.

Base station communications manager 1415 may also include downlink control information formatter 1425, uplink control information processor 1430, and unscheduled uplink data processor 1435.

Downlink control information formatter 1425 may transmit to a UE, by a base station, a RRC message including an indication of a uplink group of the UE, the uplink group associated with one or more uplink subframes and transmit downlink control information to the UE. In some cases, the indication of the uplink group of the UE includes an explicit identification of the uplink group of the UE. In some cases, the uplink group is identified based on a number of uplink subframes and a number of repetitions for the unscheduled uplink data.

Uplink control information processor 1430 may receive, from the UE, uplink control information for the one or more uplink subframes associated with the indicated uplink group of the UE. In some cases, the uplink control information includes one or more of: a new data indicator, a redundancy version, a HARQ identifier, a UE identifier, a number of repetitions for uplink control data, and a number of repetitions for the unscheduled uplink data. In some cases, the uplink control information includes an indication of resource blocks associated with the unscheduled uplink data. In some cases, the resource blocks associated with the unscheduled uplink data include a subset of a total number of resource blocks allocated to the UE for the unscheduled uplink data in the RRC message.

Unscheduled uplink data processor 1435 may receive unscheduled uplink data during at least one of the one or more of the uplink subframes based on the uplink group of the UE is assigned and the uplink control information.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
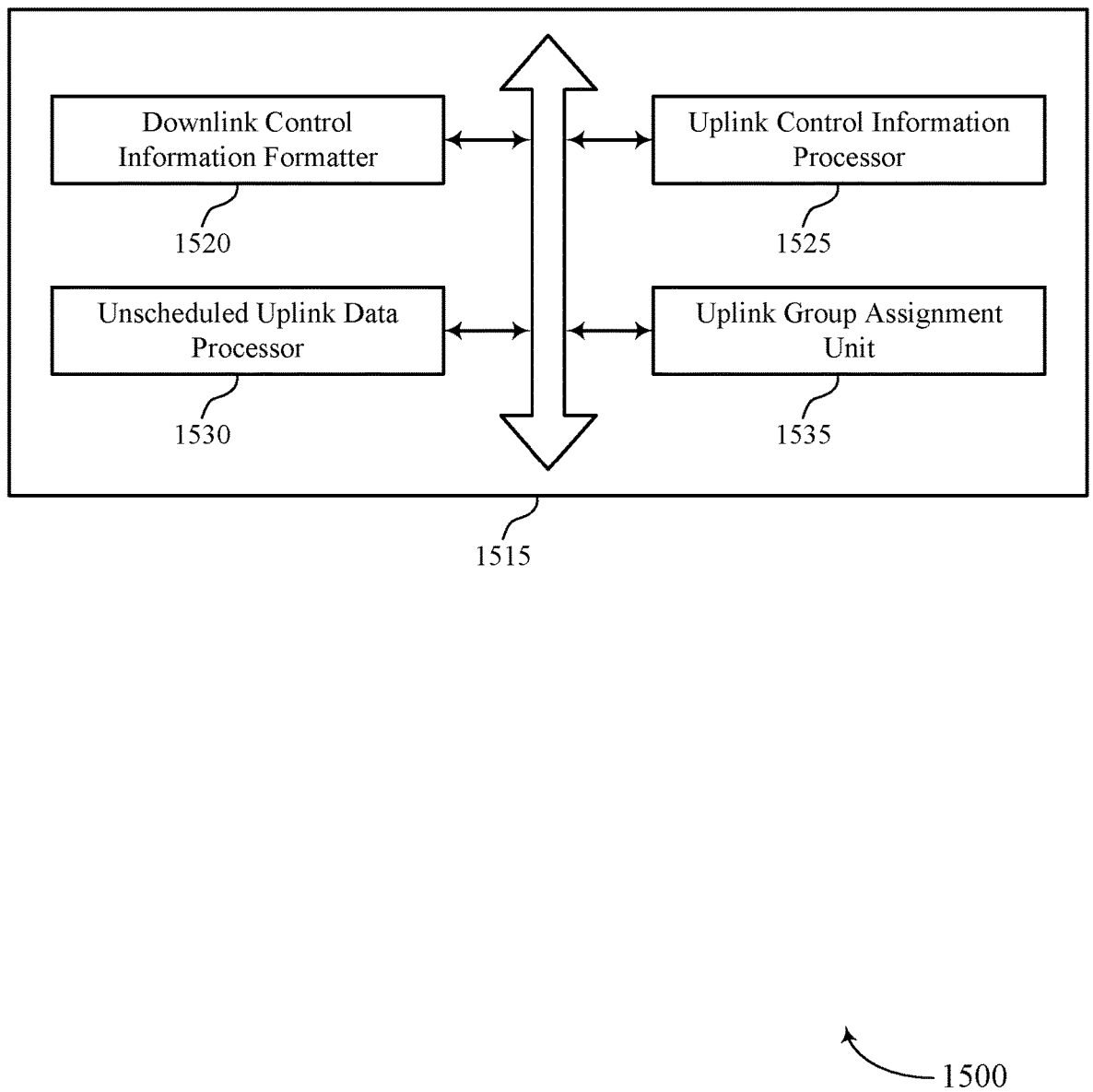

FIG. 15 shows a block diagram 1500 of a base station communications manager 1515 that supports grantless uplink transmission for EMTC-U in accordance with aspects of the present disclosure. The base station communications manager 1515 may be an example of aspects of a base station communications manager 1615 described with reference to FIGS. 13, 14, and 16. The base station communications manager 1515 may include downlink control information formatter 1520, uplink control information processor 1525, unscheduled uplink data processor 1530, and uplink group assignment unit 1535. Each of these modules may communicate, directly or indirectly, with one another (e.g., via one or more buses).

Downlink control information formatter 1520 may transmit to a UE, by a base station, a RRC message including an indication of a uplink group of the UE, the uplink group associated with one or more uplink subframes and transmit downlink control information to the UE. In some cases, the indication of the uplink group of the UE includes an explicit identification of the uplink group of the UE. In some cases, the uplink group is identified based on a number of uplink subframes and a number of repetitions for the unscheduled uplink data.

Uplink control information processor 1525 may receive, from the UE, uplink control information for the one or more uplink subframes associated with the indicated uplink group of the UE. In some cases, the uplink control information includes one or more of: a new data indicator, a redundancy version, a HARQ identifier, a UE identifier, a number of repetitions for uplink control data, and a number of repetitions for the unscheduled uplink data. In some cases, the uplink control information includes an indication of resource blocks associated with the unscheduled uplink data. In some cases, the resource blocks associated with the unscheduled uplink data include a subset of a total number of resource blocks allocated to the UE for the unscheduled uplink data in the RRC message.

Unscheduled uplink data processor 1530 may receive unscheduled uplink data during at least one of the one or more of the uplink subframes based on the uplink group of the UE is assigned and the uplink control information.

Uplink group assignment unit 1535 may associate the UE with the uplink group based on the measurement report.

Figure 16:
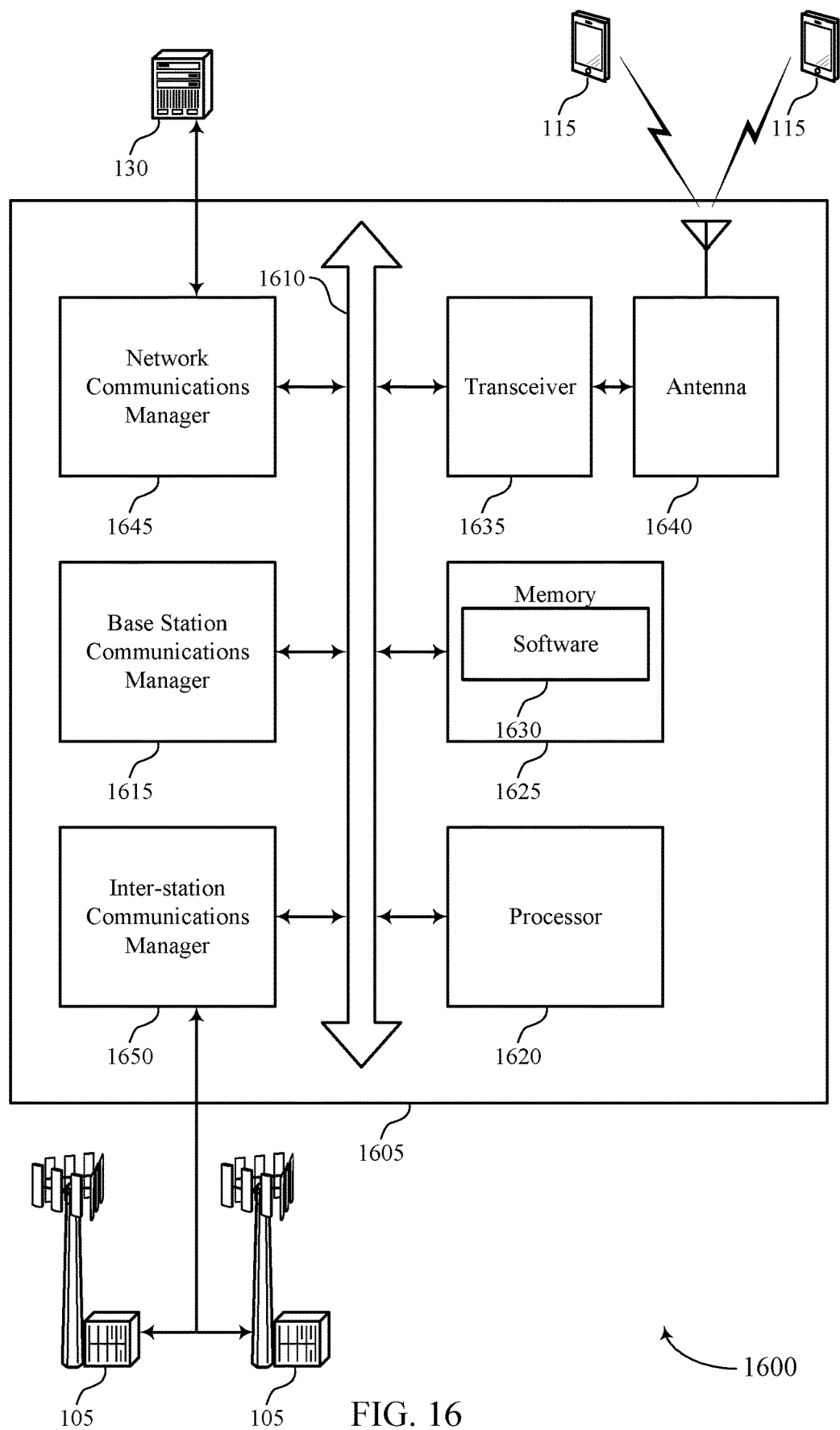
FIG. 16 illustrates a block diagram of a system including a base station that supports grantless uplink transmission for eMTC-U in accordance with aspects of the present disclosure.

FIG. 16 shows a diagram of a system 1600 including a device 1605 that supports grantless uplink transmission for EMTC-U in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting grantless uplink transmission for EMTC-U).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support grantless uplink transmission for EMTC-U. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
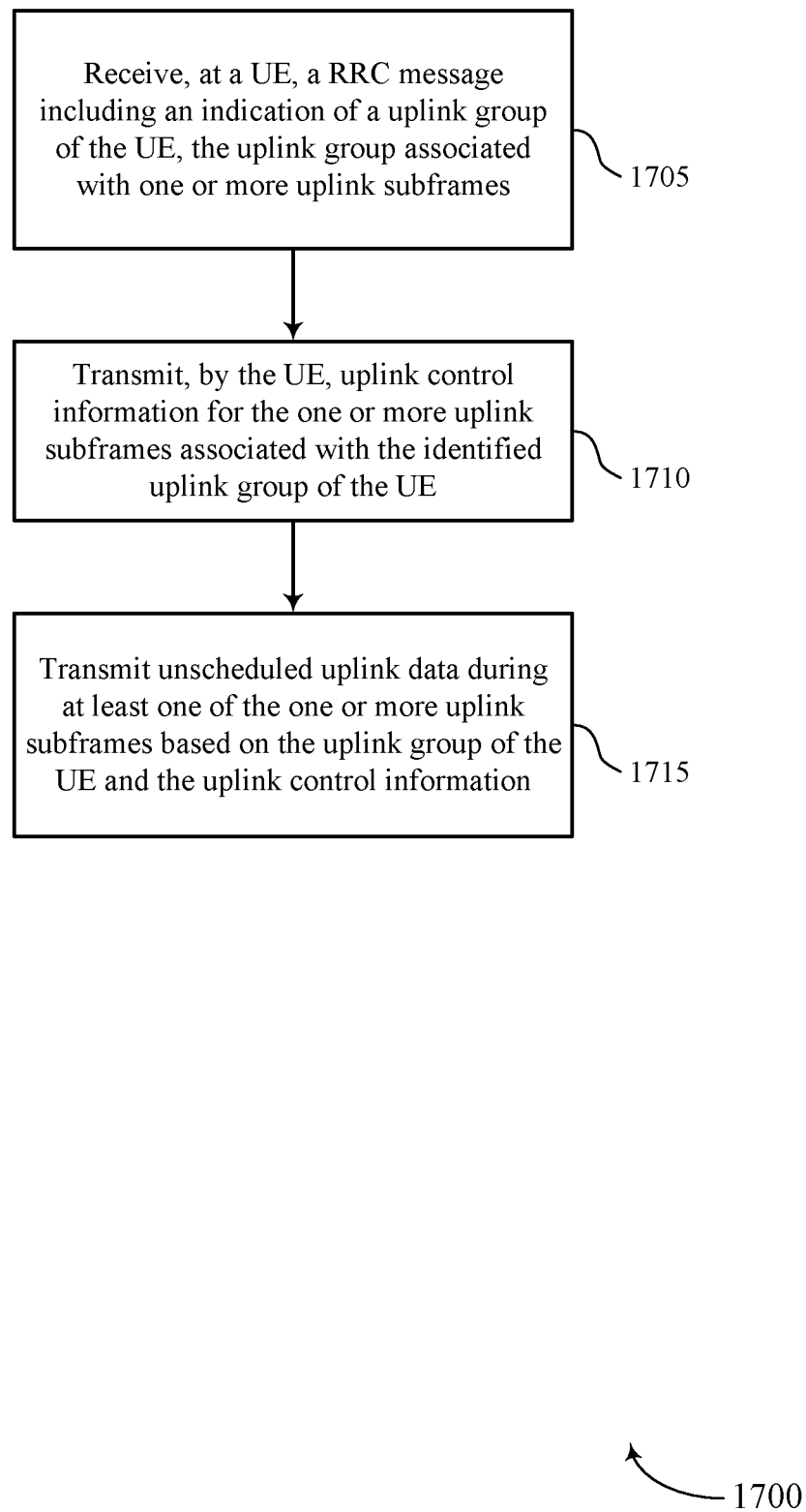
FIGS. 17 through 18 illustrate methods for grantless uplink transmission for eMTC-U in accordance with aspects of the present disclosure.

FIG. 17 shows a flowchart illustrating a method 1700 for grantless uplink transmission for EMTC-U in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, at a user equipment (UE), a radio resource control (RRC) message comprising an indication of a uplink group of the UE, the uplink group associated with one or more uplink subframes. The operations of block 1705 may be performed according to the methods described herein. In certain examples, aspects of the operations of block 1705 may be performed by a group identifier as described with reference to FIGS. 9 through 12.

At block 1710 the UE 115 may transmit, by the UE, uplink control information for the one or more uplink subframes associated with the indicated uplink group of the UE. The operations of block 1710 may be performed according to the methods described herein. In certain examples, aspects of the operations of block 1710 may be performed by a uplink control information scheduler as described with reference to FIGS. 9 through 12.

At block 1715 the UE 115 may transmit unscheduled uplink data during at least one of the one or more uplink subframes based at least in part on the uplink group of the UE and the uplink control information. The operations of block 1715 may be performed according to the methods described herein. In certain examples, aspects of the operations of block 1715 may be performed by a unscheduled uplink data scheduler as described with reference to FIGS. 9 through 12.

Figure 18:
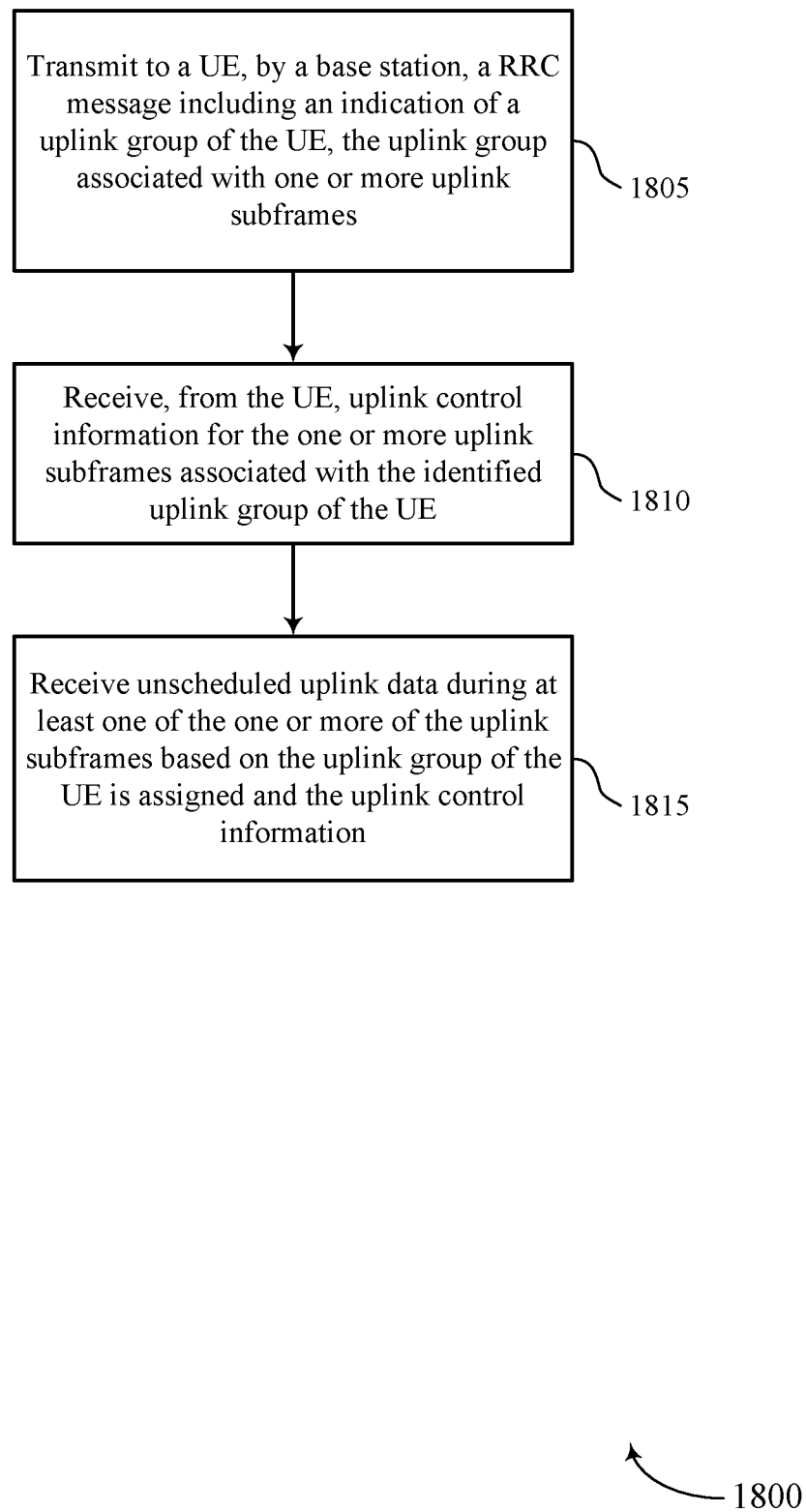

FIG. 18 shows a flowchart illustrating a method 1800 for grantless uplink transmission for EMTC-U in accordance with aspects of the present disclosure. The operations of method 1800 may be implemented by a base station 105 or its components as described herein. For example, the operations of method 1800 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit to a user equipment (UE), by a base station, a radio resource control (RRC) message comprising an indication of a uplink group of the UE, the uplink group associated with one or more uplink subframes. The operations of block 1805 may be performed according to the methods described herein. In certain examples, aspects of the operations of block 1805 may be performed by a downlink control information formatter as described with reference to FIGS. 13 through 16.

At block 1810 the base station 105 may receive, from the UE, uplink control information for the one or more uplink subframes associated with the indicated uplink group of the UE. The operations of block 1810 may be performed according to the methods described herein. In certain examples, aspects of the operations of block 1810 may be performed by a uplink control information processor as described with reference to FIGS. 13 through 16.

At block 1815 the base station 105 may receive unscheduled uplink data during at least one of the one or more of the uplink subframes based at least in part on the uplink group of the UE is assigned and the uplink control information. The operations of block 1815 may be performed according to the methods described herein. In certain examples, aspects of the operations of block 1815 may be performed by a unscheduled uplink data processor as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a user equipment (UE), a radio resource control (RRC) message comprising an indication of an assignment of the UE to an uplink group, the uplink group associated with one or more uplink subframes available for use by UEs belonging to the uplink group for unscheduled data transmission;
   transmitting, by the UE, uplink control information for the one or more uplink subframes associated with the uplink group of the UE; and
   transmitting unscheduled uplink data during at least one of the one or more uplink subframes based at least in part on the uplink group of the UE and the uplink control information.

2. The method of claim 1, further comprising:
   determining, based at least in part on the RRC message, a set of uplink resources for the uplink control information for the one or more uplink subframes.

3. The method of claim 1, further comprising:
   determining a frequency subband of a system bandwidth based at least in part on the uplink group of the UE; and
   wherein the unscheduled uplink data is transmitted using the frequency subband of the system bandwidth during the at least one of the one or more uplink subframes.

4. The method of claim 3, further comprising:
determining, based at least in part on the RRC message, a resource block allocation to the UE for the unscheduled uplink data; and
wherein the resource block allocation to the UE is a subset of a total set of resource blocks associated with the frequency subband, and the unscheduled uplink data is transmitted using the resource block allocation during the at least one of the one or more uplink subframes.

5. The method of claim 1, further comprising:
receiving downlink control information from a base station;
determining, based at least in part on the downlink control information, a frame structure and an uplink subframe type for the unscheduled uplink data; and
transmitting the unscheduled uplink data during the at least one of the one or more uplink subframes is further based at least in part on the determined frame structure and the uplink subframe type.

6. The method of claim 5, further comprising:
determining, based at least in part on the downlink control information, that an unscheduled uplink data transmission is permissible during a current frame; and
transmitting the unscheduled uplink data during the at least one of the one or more uplink subframes is further based on the determination that the unscheduled uplink data transmission is permissible during the current frame.

7. The method of claim 1, further comprising:
transmitting uplink capability information of the UE to a base station.

8. The method of claim 1, wherein:
the indication of the assignment of the UE to the uplink group comprises an explicit identification of the uplink group of the UE.

9. The method of claim 1, wherein:
the uplink group of the UE is identified based at least in part on a number of uplink subframes and a number of repetitions for the unscheduled uplink data.

10. The method of claim 1, further comprising:
providing a measurement report to a base station; and
wherein the UE is associated with the uplink group based at least in part on the measurement report.

11. The method of claim 1, wherein:
the uplink control information comprises one or more of: a new data indicator, a redundancy version, a hybrid automatic repeat request (HARQ) identifier, a UE identifier, a number of repetitions for uplink control information, and a number of repetitions for the unscheduled uplink data.

12. The method of claim 11, further comprising:
determining the number of repetitions based at least in part on a signal strength measurement or signaling from a base station.

13. The method of claim 1, wherein:
the uplink control information comprises an indication of resource blocks associated with the unscheduled uplink data.

14. The method of claim 13, wherein:
the resource blocks associated with the unscheduled uplink data comprise a subset of a total number of resource blocks allocated to the UE for the unscheduled uplink data in the RRC message.

15. A method for wireless communication, comprising:
transmitting to a user equipment (UE), by a base station, a radio resource control (RRC) message comprising an indication of an assignment of the UE to an uplink group, the uplink group associated with one or more uplink subframes available for use by UEs belonging to the uplink group for unscheduled data transmission;
receiving, from the UE, uplink control information for the one or more uplink subframes associated with the uplink group of the UE; and
receiving unscheduled uplink data during at least one of the one or more of the uplink subframes based at least in part on the uplink group of the UE is assigned and the uplink control information.

16. The method of claim 15, further comprising:
transmitting downlink control information to the UE; and
receiving the unscheduled uplink data based at least in part on a frame structure and an uplink subframe type associated with the downlink control information.

17. The method of claim 15, further comprising:
receiving uplink capability information of the UE.

18. The method of claim 15, wherein:
the indication of the assignment of the UE to the uplink group comprises an explicit identification of the uplink group of the UE.

19. The method of claim 15, wherein:
the uplink group is identified based at least in part on a number of uplink subframes and a number of repetitions for the unscheduled uplink data.

20. The method of claim 15, further comprising:
receiving a measurement report from the UE; and
associating the UE with the uplink group based at least in part on the measurement report.

21. The method of claim 15, wherein:
the uplink control information comprises one or more of: a new data indicator, a redundancy version, a hybrid automatic repeat request (HARQ) identifier, a UE identifier, a number of repetitions for uplink control data, and a number of repetitions for the unscheduled uplink data.

22. The method of claim 15, wherein:
the uplink control information comprises an indication of resource blocks associated with the unscheduled uplink data.

23. The method of claim 22, wherein:
the resource blocks associated with the unscheduled uplink data comprise a subset of a total number of resource blocks allocated to the UE for the unscheduled uplink data in the RRC message.

24. An apparatus for wireless communication, comprising:
a processor;
memory in electronic communication with the processor; and
instructions stored in the memory and operable, when executed by the processor, to cause the apparatus to:
receive, at a user equipment (UE), a radio resource control (RRC) message comprising an indication of an assignment of the UE to an uplink group, the uplink group associated with one or more uplink subframes available for use by UEs belonging to the uplink group for unscheduled data transmission;
transmit, by the UE, uplink control information for the one or more uplink subframes associated with the uplink group of the UE; and
transmit unscheduled uplink data during at least one of the one or more uplink subframes based at least in part on the uplink group of the UE and the uplink control information.

25. The apparatus of claim 24, wherein the instructions are further executable by the processor to:

determine, based at least in part on the RRC message, a set of uplink resources for the uplink control information for the one or more uplink subframes.

26. The apparatus of claim 24, wherein the instructions are further executable by the processor to:
determine a frequency subband of a system bandwidth based at least in part on the uplink group of the UE; and
wherein the unscheduled uplink data is transmitted using the frequency subband of the system bandwidth during the at least one of the one or more uplink subframes.

27. The apparatus of claim 24, wherein the instructions are further executable by the processor to:
transmit uplink capability information of the UE to a base station.

28. The apparatus of claim 24, wherein:
the indication of the assignment of the UE to the uplink group comprises an explicit identification of the uplink group of the UE.

29. The apparatus of claim 24, wherein:
the uplink control information comprises one or more of: a new data indicator, a redundancy version, a hybrid automatic repeat request (HARQ) identifier, a UE identifier, a number of repetitions for uplink control information, and a number of repetitions for the unscheduled uplink data.

30. An apparatus for wireless communication, comprising:
a processor;
memory in electronic communication with the processor; and
instructions stored in the memory and operable, when executed by the processor, to cause the apparatus to:
transmit to a user equipment (UE), by a base station, a radio resource control (RRC) message comprising an indication of an assignment of the UE to an uplink group, the uplink group associated with one or more uplink subframes available for use by UEs belonging to the uplink group for unscheduled data transmission;
receive, from the UE, uplink control information for the one or more uplink subframes associated with the uplink group of the UE; and
receive unscheduled uplink data during at least one of the one or more of the uplink subframes based at least in part on the uplink group of the UE is assigned and the uplink control information.

* * * * *